(12) United States Patent
Gilliam et al.

(10) Patent No.: US 12,330,332 B2
(45) Date of Patent: Jun. 17, 2025

(54) METHODS AND SYSTEMS FOR 3D PRINTING OF REACTIVE VATERITE CEMENT

(71) Applicant: Arelac, Inc., San Jose, CA (US)

(72) Inventors: Ryan J Gilliam, San Jose, CA (US); Craig W Hargis, Campbell, CA (US); Kasra Farsad, San Jose, CA (US)

(73) Assignee: Arelac, Inc., San Jose, CA (US)

( * ) Notice: Subject to any disclaimer, the term of this patent is extended or adjusted under 35 U.S.C. 154(b) by 0 days.

(21) Appl. No.: 17/982,747

(22) Filed: Nov. 8, 2022

(65) Prior Publication Data

US 2023/0145402 A1    May 11, 2023

Related U.S. Application Data

(60) Provisional application No. 63/277,330, filed on Nov. 9, 2021.

(51) Int. Cl.
| | |
|---|---|
| *B28B 1/00* | (2006.01) |
| *B28B 1/08* | (2006.01) |
| *B33Y 40/00* | (2020.01) |
| *C04B 7/34* | (2006.01) |
| *C04B 7/43* | (2006.01) |

(Continued)

(52) U.S. Cl.
CPC ............... *B28B 1/001* (2013.01); *B28B 1/08* (2013.01); *B33Y 40/00* (2014.12); *C04B 7/34* (2013.01); *C04B 7/434* (2013.01); *C04B 28/12* (2013.01); *C04B 40/0067* (2013.01); *C04B 40/0071* (2013.01); *C04B 40/04* (2013.01); *C04B 2103/54* (2013.01); *C04B 2111/00181* (2013.01)

(58) Field of Classification Search
USPC ..................................... 264/34, 35
See application file for complete search history.

(56) References Cited

U.S. PATENT DOCUMENTS

| | | | | |
|---|---|---|---|---|
| 3,914,359 A | * | 10/1975 | Bevan ............... | B28B 3/2636 264/45.3 |
| 8,932,400 B2 | * | 1/2015 | Chen ................. | C04B 28/04 106/713 |

(Continued)

FOREIGN PATENT DOCUMENTS

| | | | | |
|---|---|---|---|---|
| CN | 107685379 | * | 2/2018 | ............ B28B 1/001 |
| CN | 109514689 A | * | 3/2019 | ............ B28B 1/001 |

(Continued)

OTHER PUBLICATIONS

PCT/US2022/049265 International Search Report and Written Opinion dated Feb. 14, 2023.

(Continued)

*Primary Examiner* — Nahida Sultana
(74) *Attorney, Agent, or Firm* — Schwegman Lundberg & Woessner, P.A.

(57) ABSTRACT

Provided herein are compositions, methods, and systems related to 3D printing a reactive vaterite cement composition, comprising feeding a composition comprising reactive vaterite cement through a 3D printing machine; printing a 3D printed reactive vaterite cement product; and curing the 3D printed reactive vaterite cement product by transforming reactive vaterite cement in the 3D printed reactive vaterite cement product to aragonite and/or calcite during and/or after the curing.

20 Claims, 9 Drawing Sheets

(51) Int. Cl.
*C04B 28/12* (2006.01)
*C04B 40/00* (2006.01)
*C04B 40/04* (2006.01)
C04B 103/54 (2006.01)
C04B 111/00 (2006.01)

(56) References Cited

U.S. PATENT DOCUMENTS

| | | | |
|---|---|---|---|
| 11,377,363 B2 | 7/2022 | Gilliam et al. | |
| 11,530,164 B2 | 12/2022 | Hargis et al. | |
| 11,673,832 B1 | 6/2023 | Hargis et al. | |
| 2011/0038774 A1* | 2/2011 | Zhong | C01B 7/055 423/234 |
| 2014/0252668 A1* | 9/2014 | Austin | B28B 1/001 425/375 |
| 2015/0239148 A1* | 8/2015 | Israel | B29C 64/106 425/375 |
| 2016/0221834 A1* | 8/2016 | Hasinoff | C01C 1/244 |
| 2016/0326052 A1* | 11/2016 | Camali | C04B 7/153 |
| 2017/0151371 A1* | 6/2017 | Engqvist | C04B 28/34 |
| 2017/0165870 A1* | 6/2017 | Niven | B28B 17/0081 |
| 2017/0253537 A1* | 9/2017 | Danforth | B29C 64/106 |
| 2018/0022614 A1 | 1/2018 | Paynter et al. | |
| 2018/0044257 A1* | 2/2018 | Summers | B33Y 30/00 |
| 2018/0071949 A1* | 3/2018 | Giles | B28B 1/001 |
| 2018/0311892 A1* | 11/2018 | Abbott, Jr. | B28B 11/243 |
| 2020/0047252 A1* | 2/2020 | Kritchman | C04B 35/56 |
| 2020/0047404 A1* | 2/2020 | Plott | B33Y 10/00 |
| 2020/0094436 A1* | 3/2020 | Blair | C04B 35/638 |
| 2020/0122392 A1* | 4/2020 | Townsend | B29C 64/364 |
| 2020/0130258 A1* | 4/2020 | Hengl | B28B 1/001 |
| 2021/0017035 A1 | 1/2021 | Weiss et al. | |
| 2021/0039308 A1* | 2/2021 | Flitsch | B33Y 50/02 |
| 2021/0107177 A1* | 4/2021 | Giles | E04B 1/35 |
| 2021/0261428 A1 | 8/2021 | Weiss et al. | |
| 2021/0261429 A1 | 8/2021 | Weiss et al. | |
| 2021/0284575 A1* | 9/2021 | Martinage | C04B 28/04 |
| 2022/0154478 A1* | 5/2022 | Boon | B33Y 30/00 |
| 2022/0306483 A1 | 9/2022 | Gilliam et al. | |
| 2023/0099641 A1 | 3/2023 | Hargis et al. | |
| 2023/0104761 A1 | 4/2023 | Weiss et al. | |
| 2023/0107410 A1 | 4/2023 | Weiss et al. | |
| 2023/0112173 A1 | 4/2023 | Hargis et al. | |
| 2023/0118703 A1 | 4/2023 | Weiss et al. | |
| 2023/0192546 A1 | 6/2023 | Hargis et al. | |

FOREIGN PATENT DOCUMENTS

| | | |
|---|---|---|
| CN | 214605934 U | 11/2021 |
| WO | WO-2017196328 A1 | 11/2017 |
| WO | 2023086331 | 10/2023 |

OTHER PUBLICATIONS

Co-pending U.S. Appl. No. 18/122,930, inventors Craig; W. Hargis et al., filed Mar. 17, 2023.

Co-pending U.S. Appl. No. 18/136,600, inventors Hargis Craig et al., filed Apr. 19, 2023.

Co-pending U.S. Appl. No. 18/139,815, inventors Hargis Craig; W. et al., filed Apr. 26, 2023.

Co-pending U.S. Appl. No. 18/141,129, inventors Hargis Craig; W. et al., filed Apr. 28, 2023.

Co-pending U.S. Appl. No. 18/200,208, inventors Michael; Joseph Weiss et al., filed May 22, 2023.

"International Application Serial No. PCT US2022 049265, International Preliminary Report on Patentability mailed May 23, 2024", 8 pgs.

* cited by examiner

METHODS AND SYSTEMS FOR 3D PRINTING OF REACTIVE VATERITE CEMENT

CROSS-REFERENCE TO RELATED APPLICATION

This application claims benefit of U.S. Provisional Application No. 63/277,330, filed Nov. 9, 2021, which is incorporated herein by reference in its entirety in the present disclosure.

BACKGROUND 3D printing in construction offers a cheap and efficient way to construct houses to handle housing crisis, shortage of skilled labor, climate change, and rising material costs. The 3D printing technique can mass produce the houses without releasing too much carbon into the atmosphere. Instead of conventional materials like steel, aluminum and lumber, the 3D-printed structures may be built by a robot squeezing a cement mixture out of a nozzle, layer upon layer. However, the 3D printing technology suffers from the challenges of finding an appropriate material that can flow through the nozzle of the 3D printer yet maintain its integrity after the printing.

Provided herein are compositions, methods, and systems that provide unique solutions to the 3D printing of the construction materials and processes.

SUMMARY

In one aspect, there is provided a method of 3D printing a composition comprising reactive vaterite cement, comprising (i) feeding a composition comprising reactive vaterite cement through a 3D printing machine; (ii) printing a 3D printed reactive vaterite cement product; and (iii) curing the 3D printed reactive vaterite cement product and transforming reactive vaterite cement in the 3D printed reactive vaterite cement product to aragonite and/or calcite during and/or after the curing. In some embodiments of the foregoing aspect, the composition is thixotropic.

In one aspect, there is provided a method comprising: (i) feeding a thixotropic composition comprising reactive vaterite cement through a 3D printing machine; (ii) printing a 3D printed reactive vaterite cement product; and (iii) curing the 3D printed reactive vaterite cement product and transforming the reactive vaterite cement in the 3D printed reactive vaterite cement product to aragonite and/or calcite during and/or after the curing, wherein during the feeding, the printing, and/or the curing, providing one or more of pressure, heat, and/or humidity to make the composition comprising reactive vaterite cement flow, to prevent transformation of the reactive vaterite cement, and/or to increase rate of the transformation.

In some embodiments of the foregoing aspects, the method further comprises (iv) producing a 3D printed cement product after the transformation of the reactive vaterite cement in the 3D printed reactive vaterite cement product to the aragonite and/or the calcite and its setting and hardening.

In some embodiments of the foregoing aspects and embodiments, the method further comprises before and/or during the step of feeding, providing high shear mixing to the composition comprising reactive vaterite cement to mix and/or make it flowable.

In some embodiments of the foregoing aspects and embodiments, the method further comprises during the feeding and/or the printing step, providing vibrations to the 3D printing machine to provide mixing to the composition comprising reactive vaterite cement and/or making it flowable.

In some embodiments of the foregoing aspects and embodiments, the method further comprises during the mixing, the feeding, the printing, and/or the curing step, providing one or more of pressure, heat, and/or humidity to make the composition flowable and/or to increase rate of the transformation of the reactive vaterite cement in the 3D printed reactive vaterite cement product to the aragonite and/or the calcite and its setting and hardening.

In some embodiments of the foregoing aspects and embodiments, the pressure is between about 10-100,000 psi or between about 10-1000 psi or between about 10-1500 psi; the heat is between about 20-300° C. or between about 20-150° C.; and/or the humidity is between about 40-100% relative humidity (RH) or between about 80-100% RH.

In some embodiments of the foregoing aspects and embodiments, the pressure is between about 10-1000 psi; the heat is between about 20-300° C.; and/or the humidity is between about 40-100% relative humidity (RH).

In some embodiments of the foregoing aspects and embodiments, during the feeding and/or the printing providing one or more of the pressure of between about 10-100 psi; the heat of between about 20-40° C.; and/or the humidity of between about 40-60% RH to make the composition comprising reactive vaterite cement flow and/or to prevent transformation of the reactive vaterite cement.

In some embodiments of the foregoing aspects and embodiments, during the curing providing one or more of the pressure of between about 10-20 psi; the heat of between about 20-80° C.; and/or the humidity of between about 80-100% RH to increase rate of the transformation of the reactive vaterite cement to the aragonite and/or the calcite.

In some embodiments of the foregoing aspects and embodiments, the composition comprising reactive vaterite cement, the 3D printed reactive vaterite cement product, and the 3D printed cement product is white in color. In some embodiments of the foregoing aspects and embodiments, the method further comprises adding a color dye to the composition comprising reactive vaterite cement before and/or during the feeding, to the 3D printed reactive vaterite cement product during the printing and/or curing, and/or to the 3D printed cement product during and/or after the curing, to form a colored 3D printed cement product.

In some embodiments of the foregoing aspects and embodiments, the composition comprising reactive vaterite cement comprises unimodal, bimodal, or multi-modal particle distribution of reactive vaterite cement particles. In some embodiments of the foregoing aspects and embodiments, the particle distribution affects flow of the composition during the feeding, the printing, and/or the curing step. In some embodiments of the foregoing aspects and embodiments, the particle distribution affects porosity or bulk density of the 3D printed reactive vaterite cement product and/or 3D printed cement product.

In some embodiments of the foregoing aspects and embodiments, the 3D printed reactive vaterite cement product or the 3D printed cement product is selected from the group consisting of masonry unit, construction panel, conduit, basin, beam, column, slab, acoustic barrier, insulation material, building, driveway, foundation, kitchen slab, furniture, pavement, road, bridge, motorway, overpass, parking structure, brick, block, wall, footing for a gate, fence, pole, decorative object, and module thereof.

In some embodiments of the foregoing aspects and embodiments, the reactive vaterite cement composition is thixotropic.

In some embodiments of the foregoing aspects and embodiments, the reactive vaterite cement composition further comprises admixture selected from the group consisting of set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforcing material, and combination thereof.

In some embodiments of the foregoing aspects and embodiments, the composition comprising reactive vaterite cement comprises reactive vaterite cement having a specific surface area of 100-30,000 $m^2/kg$; and/or having an average particle size of between 0.1-100 µm.

In some embodiments of the foregoing aspects and embodiments, the composition comprising reactive vaterite cement comprises reactive vaterite cement and one or more components selected from the group consisting of Portland cement, Portland cement clinker, aggregate, supplementary cementitious material (SCM), and combination thereof.

In some embodiments of the foregoing aspects and embodiments, the method further comprises producing the composition comprising reactive vaterite cement before the feeding step.

In some embodiments of the foregoing aspects and embodiments, the method further comprises producing the composition comprising reactive vaterite cement by (a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form a composition comprising reactive vaterite cement.

In some embodiments of the foregoing aspects and embodiments, the method further comprises producing the reactive vaterite cement composition by (a) dissolving limestone in a N-containing salt solution to produce an aqueous solution comprising calcium salt, and a gaseous stream comprising carbon dioxide; and (b) treating the aqueous solution comprising calcium salt with the gaseous stream comprising carbon dioxide to form a composition comprising reactive vaterite cement.

In one aspect, there is provided 3D printing machine system to form a 3D printed cement product, comprising: (i) a feed system configured to feed a composition comprising reactive vaterite cement to printing head of a 3D printing machine; (ii) the 3D printing machine operably connected to the feed system and configured to accept the composition comprising reactive vaterite cement and print a 3D printed reactive vaterite cement product; and (iii) a vibrator system operably connected to the feed system and/or the 3D printing machine and configured to vibrate the feed system and/or one or more components of the 3D printing machine to provide mixing of the composition comprising reactive vaterite cement and/or make it flowable.

In some embodiments of the foregoing aspect and embodiments, the vibrator system is selected from the group consisting of ultrasonic transducer, oscillator, mechanical vibration, non-impacting linear vibrator, electric vibrator, pneumatic vibrator, acoustic vibrator, magnetic vibrator, rotary turbine vibrator, turbine vibrator, compacting vibrator, roller vibrator, ball vibrator, and combination thereof.

In some embodiments of the foregoing aspect and embodiments, the system further comprises one or more material chambers operably connected to the feed system, the 3D printing machine, and/or the vibrator system configured to provide one or more of pressure, heat, and/or humidity to make the composition flow, to prevent transformation of the reactive vaterite cement, and/or cure the 3D printed reactive vaterite cement product by controlling rate of transformation of the reactive vaterite cement in the 3D printed reactive vaterite cement product to aragonite and/or calcite and its setting and hardening to form a 3D printed cement product.

In some embodiments of the foregoing aspect and embodiments, the system further comprises a control system configured to remotely and/or automatedly control the feed system, the 3D printing machine, the vibrator system, and/or the one or more material chambers.

In some embodiments of the foregoing aspect and embodiments, the system further comprises a system operably connected to the 3D printing machine system and configured to produce the composition comprising reactive vaterite cement, comprising (a) a calcining reactor configured to calcine limestone to form a mixture comprising lime and a gaseous stream comprising carbon dioxide;

(b) a dissolution reactor operably connected to the calcination reactor configured for dissolving the mixture comprising lime in an aqueous N-containing salt solution to produce an aqueous solution comprising calcium salt; and (c) a treatment reactor operably connected to the dissolution reactor configured for treating the aqueous solution comprising calcium salt with the gaseous stream comprising carbon dioxide to form the composition comprising reactive vaterite cement.

In some embodiments of the foregoing aspect and embodiments, the system further comprises a system operably connected to the 3D printing machine system and configured to produce the composition comprising reactive vaterite, comprising (a) a dissolution reactor configured for dissolving limestone in an aqueous N-containing salt solution to produce an aqueous solution comprising calcium salt and a gaseous stream comprising carbon dioxide; and (b) a treatment reactor operably connected to the dissolution reactor configured for treating the aqueous solution comprising calcium salt with the gaseous stream comprising carbon dioxide to form the composition comprising reactive vaterite cement.

In some embodiments of the foregoing aspect and embodiments, the system further comprises a blending reactor operably connected to the treatment reactor configured for blending one or more components selected from the group consisting of Portland cement, Portland cement clinker, aggregate, supplementary cementitious material (SCM), and combination thereof, with the composition comprising reactive vaterite cement.

In some embodiments of the foregoing aspect and embodiments, the system further comprises a transfer system operably connected to the treatment reactor and/or the blending reactor and the feed system of the 3D printing machine system and configured to transfer the composition comprising reactive vaterite cement from the treatment reactor and/or the blending reactor to the feed system of the 3D printing machine system.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
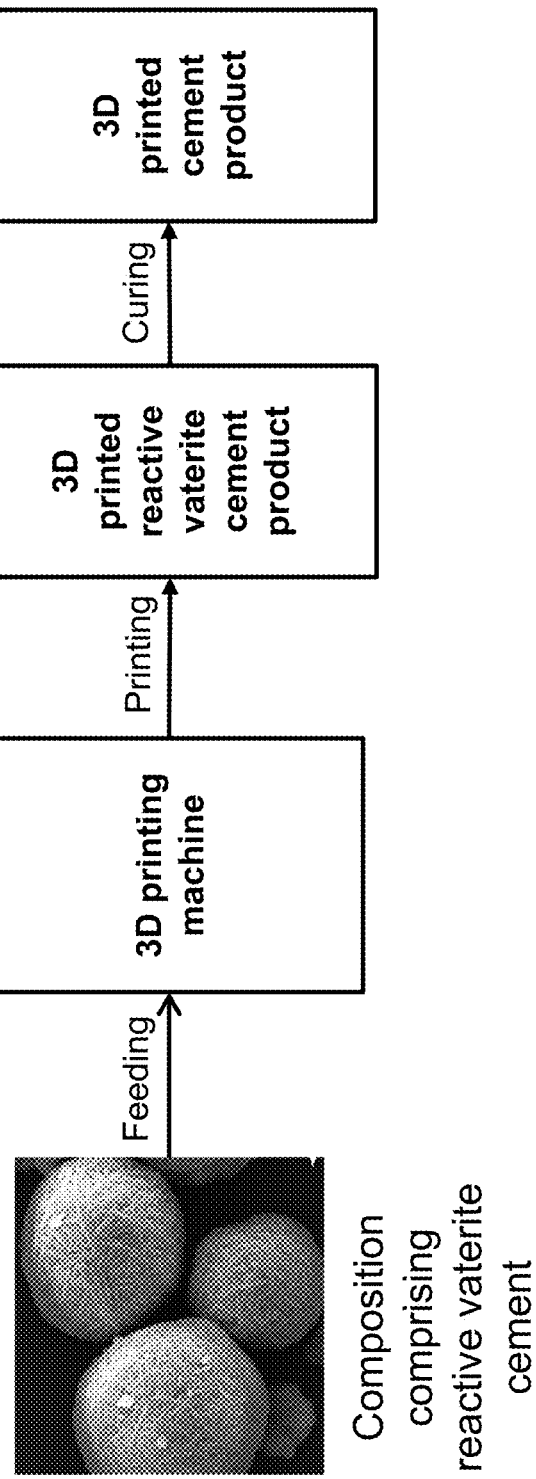
FIG. 1 illustrates some embodiments of the 3D printing of the composition comprising reactive vaterite cement.

Disclosed herein are unique methods and systems to 3D print cement products using the composition comprising reactive vaterite cement. Typically, 3D printing of the cement structures suffers from failures due to the inadequacy of the material used for the 3D printing of the cement structures. The material may not be flowable enough to flow through the machine or may be too flowing such that the top of the printed structure loses integrity, or the bottom flattens out. The composition comprising reactive vaterite cement provided herein may solve these problems as the composition is thixotropic so that the composition is flowable and easier to print and after printing the composition stays thick, keeping the integrity of the cement structure. Provided herein are compositions comprising reactive vaterite cement with various particle distributions that can be chosen such that the compositions are flowable yet stay thick and keep the integrity of the 3D printed structure.

Additionally, the reactive vaterite in the reactive vaterite cement composition, after printing, transforms to aragonite and/or calcite forms that set and harden into the 3D printed cement product. The 3D printed cement product thus formed has been found to have high compressive strength and durability. Provided herein are methods and systems that effectively utilize the composition comprising reactive vaterite cement to form the 3D printed cement product.

The methods and systems provided herein are designed in such a way that the composition comprising the reactive vaterite cement is kept in the flowable form and stays in the vaterite form until it is printed when the reactive vaterite transforms to the aragonite and/or the calcite and sets and hardens into the 3D printed cement product.

I. Methods and Systems for 3D Printing

In one aspect, there are provided methods of 3D printing a composition comprising reactive vaterite cement, comprising (i) feeding a composition comprising reactive vaterite cement through a 3D printing machine; (ii) printing a 3D printed reactive vaterite cement product; (iii) curing the 3D printed reactive vaterite cement product and transforming the reactive vaterite cement in the 3D printed reactive vaterite cement product to aragonite and/or calcite during and/or after the curing.

In one aspect, there are provided 3D printing machine systems to form a 3D printed cement product, comprising (i) a feed system configured to feed a composition comprising reactive vaterite cement to printing head (or printhead) of a 3D printing machine; and (ii) the 3D printing machine operably connected to the feed system and configured to accept the composition comprising reactive vaterite cement and print a 3D printed reactive vaterite cement product. In some embodiments, the system further comprise (iii) a vibrator system operably connected to the feed system and/or the 3D printing machine and configured to vibrate the feed system and/or one or more components of the 3D printing machine to provide mixing of the composition comprising reactive vaterite cement and/or make it flowable.

An illustration of the methods and systems is shown in FIG. 1. As shown in FIG. 1, the composition comprising reactive vaterite cement is fed to a 3D printing machine. The methods and systems to produce the composition comprising reactive vaterite cement have been provided herein.

As described herein, the composition comprising reactive vaterite cement is thixotropic. The "thixotropic" as used herein, includes a property of the composition comprising reactive vaterite cement that makes it thick or viscous under static conditions, but makes it flow over time when shaken, agitated, shear-stressed, and/or otherwise stressed. The composition comprising reactive vaterite cement may take a fixed time to return to a more viscous state. This property of the composition makes it uniquely advantageous for 3D printing purposes as the material can flow when agitated before and/or during the feeding and/or the printing but can return to a viscous state after printing so that the printed product holds integrity. Various compositions provided herein including the compositions with bimodal, trimodal or multi-modal particle distribution of the reactive vaterite cement are thixotropic compositions.

The compositions, methods and systems provided herein are also unique due to the property to keep the reactive vaterite form stabilized in the composition as well as to keep the composition flowable before and/or during the feeding and/or the printing but to transform the reactive vaterite to the stable form of the aragonite and/or the calcite during curing such that the composition sets and hardens. Such properties can be achieved using the techniques provided herein.

In the methods and systems provided herein, before and/or during the step of feeding, the methods and systems further comprise a mixer system configured to provide high shear mixing to the composition comprising reactive vaterite cement to mix the composition and/or make it flowable. Any conventional apparatus can be used as the mixer system configured to provide the high-sheer mixing including, but not limited to, pin mixer, Hobart mixer, slant cylinder mixer, Omni Mixer, Henschel mixer, V-type mixer, Nauta mixer, and the like can be employed. The one or more mixers may be attached or integrated with the 3D printing machine or may be stand alone.

The 3D printing machines are conventionally known in the art. The 3D printing machine includes a large 3D printing machine capable of printing large cement structure, e.g., home and larger commercial building, without the need for traditional framing, forming or block; and/or includes a 3D printing machine that prints smaller structure such as bench, or outdoor decoration or kitchen slab etc.; and/or includes printing module that can be assembled into various cement products.

In the methods and systems provided herein, the composition comprising reactive vaterite cement is fed to a feed system, such as, e.g., a nozzle to a printhead in the 3D printing machine that deposits the composition layer by layer to print cement product. The feed system includes, but not limited to, mixer, tank, rotating drum, conveyer belt, conduit and/or pipe to feed the composition comprising reactive vaterite cement to the 3D printing machine. In some embodiments, the 3D printing machine uses extrusion technology to deposit the composition to form layers. The 3D printing machine may be a super-sized desktop printer or a one with rotating mechanical arm. While in some embodiments, the 3D printing machine may build entire house or a building, in some embodiments, the 3D printing machine may build module, such as brick or block that can be assembled to build cement product.

For example only, in the 3D printing process, a digital 3D model may be created first using a 3D modelling software; the model may be then translated into G-Code, and the G-Code may then guide the printhead to deposit the composition comprising reactive vaterite cement pumped from a cement mixer in layers until the final cement product is printed. The 3D printer may be designed to additively manufacture parts though material extrusion using a robotic arm, with one end attached to the printhead, and the other either to a gantry or crane-like robotic arm system. Depending on the type of the 3D printer, its design, ability, and process may vary. The build volume, print-resolution, practicality, and efficiency of the 3D printer or the 3D printing machine may vary depending on its system, technology, manufacturer, and intended applications.

In the methods and systems provided herein, before and/or during the feeding and/or the printing step, the method and system further comprises providing vibrations to the feed system and/or the 3D printing machine to provide mixing to the composition comprising reactive vaterite cement and/or to make it flowable. The vibrations provided by the vibrator system facilitates thixotropic properties of the composition comprising reactive vaterite cement, as described herein. The vibrations may be provided using any means for providing the vibrations, such as, but not limited to, a vibrator system selected from the group consisting of ultrasonic transducer, oscillator, mechanical vibration, non-impacting linear vibrator, electric vibrator, pneumatic vibrator, acoustic vibrator, magnetic vibrator, rotary turbine vibrator, turbine vibrator, compacting vibrator, roller vibrator, ball vibrator, and combination thereof. In some embodiments, the vibrator system is operably connected to the feed system and/or the 3D printing machine and is configured to vibrate the feed system and/or one or more components of the 3D printing machine, such as but not limited to, the nozzle for printing, the mechanical arm for printing, or other parts of the 3D printing machine, to provide mixing of the composition comprising reactive vaterite cement composition and/or make it flowable.

In the methods and systems provided herein, after the feeding of the composition comprising reactive vaterite cement into the 3D printing machine and the printing, the 3D printed reactive vaterite cement product is formed. The 3D printed reactive vaterite cement product can be any cement product possible. The cement products can be a roadway, bridge, fence, building, house etc.; or a module to build these structures; or any other decorative structure. Examples include, without limitation, masonry unit, construction panel, conduit, basin, beam, column, slab, acoustic barrier, insulation material, building, driveway, foundation, kitchen slab, furniture, pavement, road, bridges, motorway, overpass, parking structure, brick, block, wall, footing for a gate, fence, pole, decorative object, or module thereof. The "module" or its grammatical equivalent as used herein includes unit or piece that can be assembled to form a product. For examples, the bricks can be assembled to form the house or the building.

In the methods and systems provided herein, the 3D printed reactive vaterite cement product is allowed to cure to form the 3D printed cement product. The 3D printed cement product is same as the 3D printed reactive vaterite cement product except that the 3D printed cement product is a set and hardened form (in the aragonite and/or the calcite form) of the 3D printed reactive vaterite cement product. During the curing step, the reactive vaterite cement in the 3D printed reactive vaterite cement product transforms to the aragonite and/or the calcite (more stable polymorphs of the vaterite) which set and harden into the 3D printed cement product.

The reactive vaterite and the transformed forms, such as, the aragonite or the calcite, may have varying degrees of solubility so that vaterite may dissolve when hydrated in aqueous solution and reprecipitate stable carbonate mineral, such as the calcite and/or the aragonite. The reactive vaterite cement material in the composition is stable in a dry powdered form or in a slurry form. The reactive vaterite cement in the composition may not completely convert to the stable form, such as the aragonite and/or the calcite, for cementation until cured. The aragonite and/or the calcite may impart one or more unique characteristics to the 3D printed cement product including, but not limited to, high compressive strength, complex microstructure network and binding, etc. In addition, the thixotropic properties of the composition comprising reactive vaterite cement allows it to retain shape after printing into the 3D printed reactive vaterite cement product until it sets and hardens to form the 3D printed cement product.

In some embodiments of the methods and systems provided herein, the mixer system, the feed system, the 3D printing machine, the 3D printed reactive vaterite cement product, and/or the 3D printed cement product are situated in one or more material chambers which are configured to make the composition comprising reactive vaterite cement flowable and keep it stabilized in the vaterite form (in the mixer system, the feed system, and/or the 3D printing machine system) and/or are configured to cure the 3D printed reactive vaterite cement product into the 3D printed cement product under certain conditions such as, but not limited to, pressure, heat, and/or humidity. In some embodiments of the methods and systems further comprise, during the mixing, the feeding, the printing, and/or the curing step/system, providing one or more of pressure, heat, and/or humidity to the composition comprising reactive vaterite cement to make the composition flowable and/or keep it stabilized in the vaterite form (where the reactive vaterite does not transform), and/or providing one or more of pressure, heat, and/or humidity to the 3D printed reactive vaterite cement product to increase the rate of the transformation of the reactive vaterite cement in the 3D printed reactive vaterite cement product to the aragonite and/or the calcite and its setting and hardening to form the 3D printed cement product.

In some embodiments of the foregoing embodiments, the pressure is between about 10-100,000 psi, or between about 10-75,000 psi, or between about 10-50,000 psi, or between about 10-25,000 psi, or between about 10-10,000 psi, or between about 10-2,000 psi, or between about 10-1,000 psi, or between about 10-500 psi; the heat is between about 20-300° C., or between about 20-200° C., or between about 20-150° C., or between about 20-125° C., or between about 20-100° C., or between about 20-75° C., or between about 20-50° C., or between about 40° C.-60° C., or between about 40° C.-50° C., or between about 40° C.-100° C., or between about 50° C.-60° C., or between about 50° C.-80° C., or between about 50° C.-100° C., or between about 60° C.-80° C., or between about 60° C.-100° C.; and/or the humidity is between about 40-100% relative humidity (RH), or between about 40-75% RH, or between about 40-50% RH, or between about 50-75% RH, or 40%, or 50%, or 60%, or 70%, or 90%, or 98% RH.

In some embodiments of the foregoing embodiments, the pressure is between about 10-1,000 psi, or between about 10-500 psi, or between about 10-100 psi; the heat is between about 40-150° C., or between about 40-95° C., or between about 60-80° C., or between about 75-100° C., or between about 100-150° C.; and/or the humidity is between about 75-100% RH, or between about 80-100% RH, or between about 90-100% RH, or 100% RH.

In some embodiments, the one or more material chambers provide heat and humidity in the form of steam to the composition comprising reactive vaterite cement during mixing, before the feeding, during the feeding, during the printing, and/or the curing. In some embodiments, the one or more material chambers are one or more autoclaves.

In some embodiments, the one or more material chambers is one large unit or are multiple units fitted each or in combination to the mixer system, the feed system, the 3D printing machine system, and/or the 3D printed reactive vaterite cement product. For example, in some embodiments, the material chamber is a unit fitted on the mixer system and/or the feed system to provide appropriate pressure, heat, and/or humidity conditions to the composition comprising reactive vaterite cement to keep it flowable and/or keep it stabilized in the vaterite form (where the reactive vaterite does not transform). In some embodiments, the material chamber is a unit fitted on the 3D printed reactive vaterite cement product to provide appropriate pressure, heat, and/or humidity conditions to cure the reactive vaterite cement to the aragonite and/or the calcite and form the 3D printed cement product.

In some embodiments, the material chamber may provide different pressure, heat, and/or humidity conditions to the composition comprising reactive vaterite cement to keep it flowable and/or keep it in the reactive vaterite form (and to prevent the early transformation of the reactive vaterite to the aragonite and/or the calcite) and different pressure, heat, and/or humidity conditions to cure the reactive vaterite cement to the aragonite and/or the calcite and form the 3D printed cement product. In some embodiments, the one or more material chambers may be mobile units that move over the composition comprising reactive vaterite cement to keep it flowable and/or keep it in the reactive vaterite form and/or move over the 3D printed reactive vaterite cement product to cure the reactive vaterite cement to the aragonite and/or the calcite and form the 3D printed cement product.

In one aspect, there is provided a method comprising:

(i) feeding a thixotropic composition comprising reactive vaterite cement through a 3D printing machine;

(ii) printing a 3D printed reactive vaterite cement product; and (iii) curing the 3D printed reactive vaterite cement product and transforming the reactive vaterite cement in the 3D printed reactive vaterite cement product to aragonite and/or calcite during and/or after the curing, wherein during the feeding, the printing, and/or the curing, providing one or more of pressure, heat, and/or humidity to make the composition comprising reactive vaterite cement flow and/or to increase rate of the transformation.

In some embodiments of the aspects provided herein, the pressure is between about 10-1,000 psi, or between about 10-500 psi, or between about 10-100 psi; the heat is between about 40-150° C., or between about 40-95° C., or between about 60-80° C., or between about 75-100° C., or between about 20-80° C., or between about 100-150° C.; and/or the humidity is between about 50-100% RH, or between about 80-100% RH, or between about 90-100% RH, or 100% RH.

In some embodiments of the aspects provided herein, during the feeding and/or the printing providing one or more of the pressure of between about 10-100 psi; the heat of between about 20-40° C.; and/or the humidity of between about 40-60% RH to make the composition comprising reactive vaterite cement flow and/or to prevent transformation of the reactive vaterite cement.

In some embodiments of the aspects provided herein, during the feeding and/or the printing providing one or more of the pressure of between about 10-20 psi (or ambient pressure); the heat of between about 20-40° C.; and/or the humidity of between about 40-60% RH to make the composition comprising reactive vaterite cement flow and/or to prevent transformation of the reactive vaterite cement.

In some embodiments of the aspects provided herein, during the feeding and/or the printing providing one or more of the pressure of between about 10-100 psi (or ambient pressure); the heat of between about 20-80° C.; and/or the humidity of between about 40-600% RH to make the composition comprising reactive vaterite cement flow and/or to prevent transformation of the reactive vaterite cement.

In some embodiments of the aspects provided herein, during the feeding and/or the printing providing one or more of the pressure of between about 10-20 psi; the heat of between about 5-40° C.; and/or the humidity of between about 40-60% RH to make the composition comprising reactive vaterite cement flow and/or to prevent transformation of the reactive vaterite cement.

In some embodiments of the aspects provided herein, during the curing providing one or more of the pressure of between about 10-20 psi (or ambient pressure); the heat of between about 20-80° C.; and/or the humidity of between about 80-100% RH to increase rate of the transformation of the reactive vaterite cement to the aragonite and/or the calcite.

In some embodiments, the material chamber is one or more autoclaves and the method comprises during the curing providing the pressure of between about 5-75 psi; the heat of between about 110-160° C.; and/or the humidity of between about 80-100% RH to increase rate of the transformation of the reactive vaterite cement to the aragonite and/or the calcite.

In some embodiments of the aspects provided herein, during the curing providing one or more of the pressure of between about 10-1000 psi; the heat of between about 60-80° C.; and/or the humidity of between about 90-100% RH to increase rate of the transformation of the reactive vaterite cement to the aragonite and/or the calcite.

One of the unique advantages of the composition comprising reactive vaterite cement, the 3D printed reactive vaterite cement product, and the 3D printed cement product is that they may be white in color. Due to the whiteness of the color, the composition, or the product acts as a blank canvas customizable to be mixed with any color dye for any desired color. Accordingly, the methods and systems provided herein further comprise adding a color dye (using a dye mixer in the system) to the composition comprising reactive vaterite cement before and/or during the feeding, to the 3D printed reactive vaterite cement product during the printing and/or curing, and/or to the 3D printed cement product during and/or after the curing, to form a colored 3D printed cement product. The color dyes are commercially known in the art.

II. Reactive Vaterite Cement Composition

The "reactive vaterite" or "reactive vaterite cement" as used herein, includes the vaterite material that transforms to the aragonite and/or the calcite forms during and/or after dissolution-re-precipitation process in water and sets and hardens into a cement. The "composition comprising reactive vaterite cement" or the "reactive vaterite cement composition" as used herein is a composition that has reactive vaterite cement and optionally one or more other components. The one or more other components may include, but not limited to, Portland cement, Portland cement clinker, aggregate, and/or supplementary cementitious material (SCM), or any other component described herein.

As used herein, "supplementary cementitious material" (SCM) includes SCM as is well known in the art. In some embodiments, the SCM comprises aluminosilicate material, slag, fly ash, silica fume, calcined clay, or combination thereof. In some embodiments, the aggregate comprises sand, gravel, crushed stone, slag, recycled concrete, or combination thereof.

In some embodiments, the SCM comprises aluminosilicate material. The aluminosilicate material includes any material that is rich in aluminate and silicate mineral. These materials can be natural or man-made. In some embodiments, the aluminosilicate material comprises heat-treated clay, natural or artificial pozzolan, shale, granulated blast furnace slag, or combination thereof. In some embodiments, the natural or artificial pozzolan is selected from the group consisting of fly ash, volcanic ash, or mixture thereof. Pozzolan may be naturally available and consist of very fine particles of siliceous and aluminous material that in presence of water may react with Ca ions in the reactive vaterite to form cementitious material. In some embodiments, the heat-treated clay includes, but not limited to, calcined clay, aluminosilicate glass, calcium aluminosilicate glass, or combination thereof.

Various other components that can be blended in the composition, such as but not limited to, carbonate material, such as limestone or magnesium carbonate, alkali metal accelerator, or alkaline earth metal accelerator etc. have been described herein. The alkali metal or the alkaline earth metal accelerator includes, but not limited to any alkali metal or an alkaline earth metal salt, such as e.g., sodium sulfate, sodium carbonate, sodium nitrate, potassium sulfate, potassium carbonate, potassium nitrate, potassium sulfate, lithium sulfate, lithium carbonate, lithium nitrate, calcium sulfate (or gypsum), calcium nitrate, potassium hydroxide, and combination thereof.

In some embodiments of the foregoing aspects and embodiments, the reactive vaterite cement composition includes 10% w/w to 99% w/w reactive vaterite; or from 50% w/w to 95% w/w reactive vaterite; or from 50% w/w to 90% w/w reactive vaterite; or from 50% w/w to 75% w/w reactive vaterite; or from 60% w/w to 99% w/w reactive vaterite; or from 60% w/w to 95% w/w reactive vaterite; or from 60% w/w to 90% w/w reactive vaterite; or from 70% w/w to 99% w/w reactive vaterite; or from 70% w/w to 95% w/w reactive vaterite; or from 70% w/w to 90% w/w reactive vaterite; or from 80% w/w to 99% w/w reactive vaterite; or from 80% w/w to 95% w/w reactive vaterite; or from 80% w/w to 90% w/w reactive vaterite; or from 90% w/w to 99% w/w reactive vaterite; or 10% w/w reactive vaterite; or 20% w/w reactive vaterite; or 30% w/w reactive vaterite; or 40% w/w reactive vaterite; or 50% w/w reactive vaterite; or 60% w/w reactive vaterite; or 70% w/w reactive vaterite; or 75% w/w reactive vaterite; or 80% w/w reactive vaterite; or 85% w/w reactive vaterite; or 90% w/w reactive vaterite; or 95% w/w reactive vaterite; or 99% w/w reactive vaterite. In some embodiments, the remaining amount in the foregoing amounts is one or more other components (to form a blend) selected from Portland cement, Portland cement clinker, aggregate, supplementary cementitious material (SCM), and combination thereof.

In some embodiments of the foregoing aspects and embodiments, the reactive vaterite cement has a specific surface area of between about 100-10,000 $m^2/kg$; or between about 100-9,000 $m^2/kg$; or between about 100-8,000 $m^2/kg$; or between about 100-7,000 $m^2/kg$; or between about 100-6,000 $m^2/kg$; or between about 100-5,000 $m^2/kg$; or between about 100-4,000 $m^2/kg$; or between about 100-3,000 $m^2/kg$; or between about 100-2,000 $m^2/kg$; or between about 100-1,000 $m^2/kg$; or between about 100-500 $m^2/kg$; or between about 500-10,000 $m^2/kg$; or between about 500-9,000 $m^2/kg$; or between about 500-8,000 $m^2/kg$; or between about 500-7,000 $m^2/kg$; or between about 500-6,000 $m^2/kg$; or between about 500-5,000 $m^2/kg$; or between about 500-4,000 $m^2/kg$; or between about 500-3,000 $m^2/kg$; or between about 500-2,000 $m^2/kg$; or between about 500-1,000 $m^2/kg$; or between about 1,000-10,000 $m^2/kg$; or between about 1,000-9,000 $m^2/kg$; or between about 1,000-8,000 $m^2/kg$; or between about 1,000-7,000 $m^2/kg$; or between about 1,000-6,000 $m^2/kg$; or between about 1,000-5,000 $m^2/kg$; or between about 1,000-4,000 $m^2/kg$; or between about 1,000-3,000 $m^2/kg$; or between about 1,000-2,000 $m^2/kg$; or between about 2,000-3,000 $m^2/kg$; or between about 2,000-10,000 $m^2/kg$; or between about 3,000-10,000 $m^2/kg$; or between about 4,000-10,000 $m^2/kg$; or between about 5,000-10,000 $m^2/kg$; or between about 6,000-10,000 $m^2/kg$; or between about 7,000-10,000 $m^2/kg$; or between about 8,000-10,000 $m^2/kg$.

In some embodiments of the blended compositions provided herein, the reactive vaterite cement has spherical particle shape having an average particle size of between 0.1-100 μm (micron). The average particle size (or average particle diameter) may be determined using any conventional particle size determination method, such as, but not limited to, multi-detector laser scattering or laser diffraction or sieving. In certain embodiments, unimodal or multi-modal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the reactive vaterite cement is a particulate composition with an average particle size of 0.1-100 micron; or 0.1-50 micron; or 0.1-20 micron; or 0.1-10 micron; or 0.1-5 micron; or 1-50 micron; or 1-25 micron; or 1-20 micron; or 1-10 micron; or 1-5 micron; or 5-70 micron; or 5-50 micron; or 5-20 micron; or 5-10 micron; or 10-100 micron; or 10-50 micron; or 10-20 micron; or 10-15 micron; or 15-50 micron; or 15-30 micron; or 15-20 micron; or 20-50 micron; or 20-30 micron; or 30-50 micron; or 40-50 micron; or 50-100 micron; or 50-60 micron; or 60-100 micron; or 60-70 micron; or 70-100 micron; or 70-80 micron; or 80-100 micron; or 80-90 micron; or 0.1 micron; or 0.5 micron; or 1 micron; or 2 micron; or 3 micron; or 4 micron; or 5 micron; or 8 micron; or 10 micron; or 15 micron; or 20 micron; or 30 micron; or 40 micron; or 50 micron; or 60 micron; or 70 micron; or 80 micron; or 100 micron. For example, in some embodiments, the reactive vaterite cement is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the reactive vaterite cement includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, and/or sub-micron sizes of the particles.

Applicants surprisingly and unexpectedly found that mixing certain particle sizes of the reactive vaterite cement results in high reactivity of the cement to set and harden as well as high flow and workability of the cement paste, concrete, or mortar. Applicants also surprisingly found that the particle distribution and the particle size of the reactive vaterite cement particle in the composition affect the packing density or the bulk density of the cement product such that the 3D printed cement products with ranges of the packing density or the bulk densities can be formed by using the desired particle distribution and the particle size of the reactive vaterite cement particle in the composition. Example 2 provided herein demonstrates advantages related to the customization of the particle distribution to affect the flow of the composition and obtain cement product with desired weight.

Applicants unexpectedly and surprisingly found that the unimodal particle distribution of the reactive vaterite cement (i.e., reactive vaterite cement particles of an average same size) of smaller size particles may result in high reactivity due to high surface area, however, it may also result in rapid setting and hardening of the cement, high viscosity, or low flow. Similarly, unimodal particle distribution of the reactive vaterite cement of larger size particles may result in low reactivity due to low surface area, however, it may result in low viscosity or high flow. The properties of the reactive vaterite cement in the cement paste, concrete or mortar may also interact with other components added to the paste (described herein) affecting its reactivity and flow.

Applicants also unexpectedly and surprisingly found that water demand of the reactive vaterite cement particles of different sizes differs affecting the packing density or the bulk density of the 3D printed cement product. For example, in the unimodal distribution of the reactive vaterite cement particles, one size of the spherical vaterite particles may fit together to leave space or voids between the particles. Depending on the particle size of the reactive vaterite cement, the volume of the space or the void can be modified to result in the space or the voids in the resulting 3D printed cement product with varying packing density or bulk density. Further, increased surface area in the small sized reactive vaterite cement particles may require more water to wet. More water in the paste may result in lower density 3D printed cement product as the water after evaporation and drying may leave porosity or voids. When the composition comprises reactive vaterite cement in a bimodal distribution, the small sized vaterite particles mix in with the large sized vaterite particles, where the small particles may pack between the large particles thereby increasing the solid volume and density hence increasing the packing density or the bulk density of the 3D printed cement product.

Therefore, the particle size and the distribution of the reactive vaterite cement in the composition plays a significant role in the workability, flow, packing density and compressive strength of the 3D printed cement product. Provided herein are the composition, methods and systems related to bimodal, trimodal, or multimodal particle distribution of the reactive vaterite cement that provides high packing density yet high flow.

In one aspect of the methods and systems provided herein, the composition comprises a bimodal distribution of reactive vaterite cement comprising:

reactive vaterite cement having an average particle size of between about 0.1-10 µm, or between about 0.1-5 µm, or between about 0.1-1 µm, or between about 1-10 µm, or between about 3-10 µm, or between about 6-8 µm; and reactive vaterite cement having an average particle size of between about 11-50 µm, or between about 20-50 µm, or between about 30-50 µm, or between about 30-40 µm, or between about 40-50 µm, or between about 20-30 µm.

In one aspect of the methods and systems provided herein, the composition comprises a trimodal distribution of reactive vaterite cement comprising reactive vaterite cement having an average particle size of between about 0.1-10 µm; reactive vaterite cement having an average particle size of between about 11-50 µm; and reactive vaterite cement having an average particle size of between about 51-100 µm.

In some embodiments, the reactive vaterite cement includes two or more, or three or more, or multi-modal, such as, e.g., or four or more, or five or more, or ten or more, or 20 or more, or 3-20, or 4-10 different sizes of the particles in the composition. For example, the composition may include two or more, or three or more, or between 3-20 particles ranging from 0.1-100 µm sizes of the particles.

Bimodal, trimodal, or multi-modal distributions may allow the surface area to be minimized (due to larger size particles mixed in with the smaller sized particles of the aforementioned ranges), thus allowing a lower liquids/solids mass ratio (water to cement ratio) when composition is mixed with water allowing for higher flow rate.

In some embodiments of the foregoing aspects and embodiments, the composition comprising reactive vaterite cement comprises the reactive vaterite cement; the SCM comprising aluminosilicate material, e.g. calcined clay; and optionally limestone and/or alkali metal or alkaline earth metal accelerator, and further comprises between 5-90% by weight of the Portland cement clinker; or between 5-80% by weight; or between 5-70% by weight; or between 5-60% by weight; or between 5-50% by weight; or between 5-40% by weight; or between 5-30% by weight; or between 5-20% by weight; or between 5-10% by weight; or between 10-90% by weight; or between 10-80% by weight; or between 10-70% by weight; or between 10-60% by weight; or between 10-50% by weight; or between 10-40% by weight; or between 10-30% by weight; or between 10-20% by weight; or between 20-90% by weight; or between 20-80% by weight; or between 20-70% by weight; or between 20-60% by weight; or between 20-50% by weight; or between 20-40% by weight; or between 20-30% by weight; or between 30-90% by weight; or between 30-80% by weight; or between 30-70% by weight; or between 30-60% by weight; or between 30-50% by weight; or between 30-40% by weight; or between 40-90% by weight; or between 40-80% by weight; or between 40-70% by weight; or between 40-60% by weight; or between 40-50% by weight; or between 50-90% by weight; or between 50-80% by weight; or between 50-70% by weight; or between 50-60% by weight; or between 60-90% by weight; or between 60-80% by weight; or between 60-70% by weight; or between 70-90% by weight; or between 70-80% by weight; or between 80-90% by weight of the Portland cement clinker.

In some embodiments of the compositions provided herein, the composition comprises between about 0.1-5% by weight alkali metal or alkaline earth metal accelerator, e.g., lithium carbonate; or between about 0.1-4% by weight; or between about 0.1-3% by weight; or between about 0.1-2% by weight; or between about 0.1-1% by weight; or between about 0.1-0.5% by weight; or between about 1-5% by weight; or between about 1-4% by weight; or between about 1-3% by weight; or between about 1-2% by weight; or between about 2-5% by weight; or between about 2-4% by weight; or between about 2-3% by weight; or between about 3-5% by weight; or between about 3-4% by weight; or between about 4-5% by weight.

In some embodiments of the foregoing aspects and embodiments, the composition may include a blend of by weight about 75% OPC or Portland cement clinker and between about 1-25% reactive vaterite cement; or about 80% OPC or Portland cement clinker and between about 1-20% reactive vaterite cement; or about 85% OPC or Portland cement clinker and between about 1-15% reactive vaterite cement; or about 90% OPC or Portland cement clinker and between about 1-10% reactive vaterite cement; or about 95% OPC or Portland cement clinker and between about 1-5% reactive vaterite cement. In some embodiments of the foregoing aspects and embodiments, the remaining amount in the composition may include one or more of the aluminosilicate material, and optionally the carbonate material and the alkali metal or alkaline earth metal accelerator.

In some embodiments of the reactive vaterite cement compositions provided herein, the composition comprises by weight between about 10-50% reactive vaterite cement, between about 10-35% aluminosilicate material, between about 0-10% carbonate material, and between about 15-90% Portland cement clinker. In some embodiments of the reactive vaterite cement compositions provided herein, the composition comprises by weight between about 10-50% reactive vaterite cement, between about 10-35% aluminosilicate material, between about 0-10% carbonate material, between about 15-90% Portland cement clinker, and between about 0.1-5% alkali metal or alkaline earth metal accelerator.

In some embodiments of the reactive vaterite cement compositions provided herein, the composition comprises by weight between about 10-50% reactive vaterite cement, between about 10-35% calcined clay, between about 0-10% limestone, and between about 15-90% Portland cement clinker. In some embodiments of the reactive vaterite cement compositions provided herein, the composition comprises by weight between about 10-50% reactive vaterite cement, between about 10-35% calcined clay, between about 0-10% limestone, between about 15-90% Portland cement clinker, and between about 0.1-5% gypsum or lithium carbonate.

In some embodiments of the reactive vaterite cement compositions provided herein, the composition comprises by weight between about 10-20% reactive vaterite cement, between about 10-25% calcined clay, between about 0-10% limestone, between about 25-55% Portland cement clinker, and between about 2-5% gypsum or lithium carbonate. In some embodiments of the reactive vaterite cement compositions provided herein, the composition comprises by weight between about 25-35% reactive vaterite cement, between about 25-35% calcined clay, between about 0-5% limestone, between about 25-35% Portland cement clinker, and between about 2-5% gypsum or lithium carbonate.

In some embodiments, the reactive vaterite cement compositions provided herein in wet or dried form may further include one or more plasticizers. Examples of plasticizer include, without limitation, polycarboxylate based superplasticizer, MasterGlenium 7920, MasterGlenium 7500, Fritz-Pak Supercizer PCE, sodium salt of poly(naphthalene sulfonic acid), Fritz-Pak Supercizer 5, and the like.

In some embodiments, the reactive vaterite cement compositions provided herein in wet or dried form may further include an aggregate. Aggregate may provide for mortar which includes fine aggregate and concrete which also includes coarse aggregate. The fine aggregate may be material that almost entirely passes through a Number 4 sieve (ASTM C 125 and ASTM C 33), such as silica sand. The coarse aggregate may be material that is predominantly retained on a Number 4 sieve (ASTM C 125 and ASTM C 33), such as silica, quartz, crushed marble, glass spheres, granite, calcite, feldspar, alluvial sand, sand or any other durable aggregate, and mixture thereof. As such, the aggregate is used broadly to refer to several different types of both coarse and fine particulate material, including, but are not limited to, sand, gravel, crushed stone, slag, and recycled concrete. The amount and nature of the aggregate may vary widely. In some embodiments, the amount of aggregate may range from 5 to 75% w/w of the blended compositions provided herein. In some embodiments, the aggregate is repurposed or reused concrete.

In some embodiments, the reactive vaterite cement compositions provided herein in wet or dried form, may further include one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures ranges from 0.1 to 10% w/w. Examples of the admixture include, but not limited to, set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforced material such as fiber, and any other admixture. When using an admixture, the reactive vaterite cement composition to which the admixture raw materials are introduced, is mixed for sufficient time to cause the admixture raw materials to be dispersed relatively uniformly throughout the composition.

In some embodiments, the reactive vaterite cement compositions provided herein in wet or dried form may further include reinforcing material such as fiber, e.g., where fiber-reinforced product is desirable. Fiber can be made of zirconia containing material, aluminum, glass, steel, carbon, ceramic, grass, bamboo, wood, fiberglass, or synthetic material, e.g., polypropylene, polycarbonate, polyvinyl chloride, polyvinyl alcohol, nylon, polyethylene, polyester, rayon, high-strength aramid, (i.e., Kevlar®), or mixture thereof.

In some embodiments of the foregoing aspects and the foregoing embodiments, the 3D printed reactive vaterite cement product or the 3D printed cement product after 3D printing and curing (i.e. transformation of the reactive vaterite to the aragonite and/or the calcite) has a compressive strength of at least 3 MPa; at least 7 MPa; at least 14 MPa; or at least 16 MPa; or at least 18 MPa; or at least 20 MPa; or at least 21 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 21 MPa; or 25 MPa; or 30 MPa; or 35 MPa; or 40 MPa; or 45 MPa. For example, in some embodiments, the 3D printed reactive vaterite cement product or the 3D printed cement product after 3D printing and curing has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa; or 45 MPa to 60 MPa. In some embodiments, the compressive strengths described herein are the compressive strengths after 1 day, or 3 days, or 7 days, or 28 days, or 56 days, or longer. In some embodiments, the composition after setting and hardening has a 28-day compressive strength of at least 21 MPa.

In one aspect, there are provided concrete mixes comprising any of the foregoing reactive vaterite cement compositions.

III. Methods and Systems to Produce the Reactive Vaterite Cement

In one aspect there are provided methods of 3D printing the composition comprising reactive vaterite cement, comprising:

(i) producing the composition by (a) calcining limestone to form a mixture comprising lime and a gaseous stream comprising carbon dioxide; (b) dissolving the mixture comprising lime in a N-containing salt solution to produce an aqueous solution comprising calcium salt; and (c) treating the aqueous solution comprising calcium salt with the gaseous stream comprising carbon dioxide to form a composition comprising reactive vaterite cement;

(ii) feeding the composition comprising reactive vaterite cement through the 3D printing machine;

(iii) printing the 3D printed reactive vaterite cement product; and (iv) curing the 3D printed reactive vaterite cement product and transforming the reactive vaterite cement in the 3D printed reactive vaterite cement product to the aragonite and/or the calcite during and/or after the curing.

In one aspect there are provided methods of 3D printing the composition comprising reactive vaterite cement, comprising:

(i) producing the composition by (a) dissolving limestone in a N-containing salt solution to produce an aqueous solution comprising calcium salt, and a gaseous stream comprising carbon dioxide; and (b) treating the aqueous solution comprising calcium salt with the gaseous stream comprising carbon dioxide to form the composition comprising reactive vaterite cement;

(ii) feeding the composition comprising reactive vaterite cement through the 3D printing machine;

(iii) printing the 3D printed reactive vaterite cement product; and (iv) curing the 3D printed reactive vaterite cement product and transforming the reactive vaterite cement in the 3D printed reactive vaterite cement product to the aragonite and/or the calcite during and/or after the curing.

In one aspect there are provided systems, comprising:

a system operably connected to the 3D printing machine system and configured to produce the composition comprising reactive vaterite cement, comprising (a) a calcining reactor configured to calcine limestone to form a mixture comprising lime and a gaseous stream comprising carbon dioxide;

(b) a dissolution reactor operably connected to the calcination reactor configured for dissolving the mixture comprising lime in an aqueous N-containing salt solution to produce an aqueous solution comprising calcium salt; and (c) a treatment reactor operably connected to the dissolution reactor configured for treating the aqueous solution comprising calcium salt with the gaseous stream comprising carbon dioxide to form the composition comprising reactive vaterite cement;

the 3D printing machine system to form the 3D printed cement product, comprising (i) the feed system configured to feed the composition comprising reactive vaterite cement to printing head of the 3D printing machine; and (ii) the 3D printing machine operably connected to the feed system and configured to accept the composition comprising reactive vaterite cement and print the 3D printed reactive vaterite cement product.

In one aspect there are provided systems, comprising:

a system operably connected to the 3D printing machine system and configured to produce the composition comprising reactive vaterite cement, comprising (a) a dissolution reactor configured for dissolving limestone in an aqueous N-containing salt solution to produce an aqueous solution comprising calcium salt and a gaseous stream comprising carbon dioxide; and (b) a treatment reactor operably connected to the dissolution reactor configured for treating the aqueous solution comprising calcium salt with the gaseous stream comprising carbon dioxide to form the composition comprising reactive vaterite cement;

the 3D printing machine system to form the 3D printed cement product, comprising
(i) the feed system configured to feed the composition comprising reactive vaterite cement to printing head of the 3D printing machine; and
(ii) the 3D printing machine operably connected to the feed system and configured to accept the composition comprising reactive vaterite cement and print the 3D printed reactive vaterite cement product.

In some embodiments of the foregoing aspects, the 3D printing machine system further comprises (iii) the vibrator system operably connected to the mixer system (the mixer system has been described herein), the feed system and/or the 3D printing machine and configured to vibrate the mixer system, the feed system and/or one or more components of the 3D printing machine to provide mixing of the composition comprising reactive vaterite cement and/or make it flowable.

In some embodiments of the foregoing aspects, the system further comprises a blending reactor operably connected to the treatment reactor configured for blending one or more other components selected from the group consisting of Portland cement, Portland cement clinker, aggregate, SCM, and combination thereof, with the composition comprising reactive vaterite cement.

In some embodiments of the foregoing aspects, the system further comprises a transfer system operably connected to the treatment reactor and/or the blending reactor and the feed system of the 3D printing machine system and configured to transfer the composition comprising reactive vaterite cement from the treatment reactor and/or the blending reactor to the feed system of the 3D printing machine system.

The composition comprising reactive vaterite cement can be prepared using various methods, as described further herein and illustrated in FIGS. 2A, 2B, 3A, 3B, 4A, and 4B. The composition comprising reactive vaterite cement can be produced using the limestone as a feedstock where the limestone is used as is in the process or is calcined to form the lime. The methods and systems provided herein to produce the composition comprising reactive vaterite cement have several advantages, such as but not limited to, reduction of carbon dioxide emissions through the incorporation of the carbon dioxide back into the process to form the reactive vaterite. Production of the vaterite containing precipitate, in the methods and systems provided herein, offers advantages including, operating expense savings through the reduction in fuel consumption, and reduction in carbon footprint. In the methods and systems provided herein, the emissions of the $CO_2$ from the calcination of the limestone to the lime may be avoided by recapturing it back in the cementitious reactive vaterite material By recapturing the carbon dioxide, the cement product has the potential to eliminate significant amount of the cement carbon dioxide emissions and total global emissions from all sources. This composition comprising reactive vaterite cement provided herein can be used to replace Ordinary Portland Cement (OPC) or Portland cement clinker either entirely or partially.

Figure 2A:
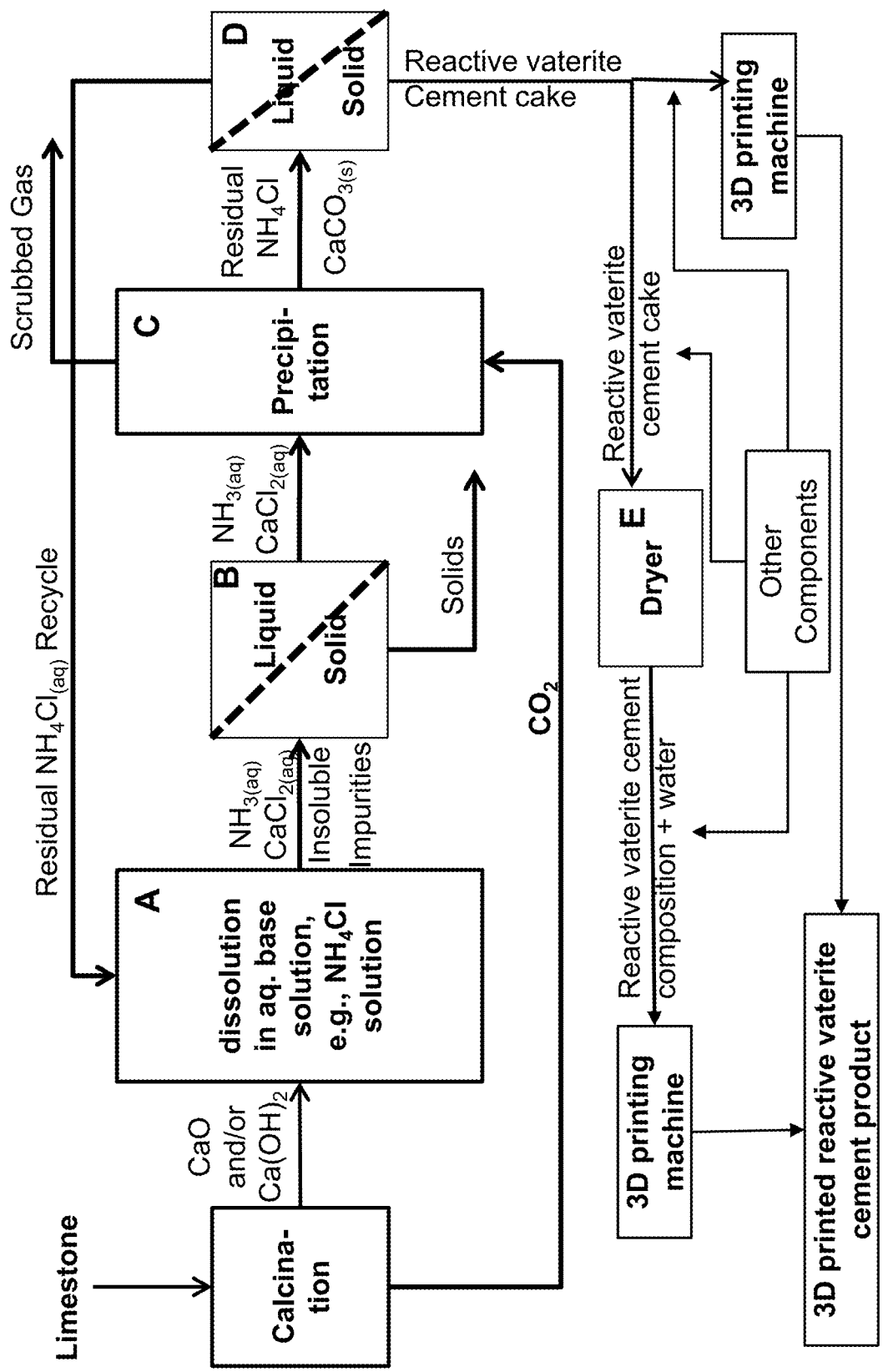
FIG. 2A illustrates some embodiments of the methods and systems provided herein employing calcination of the limestone to form the composition comprising reactive vaterite cement.
Figure 2B:
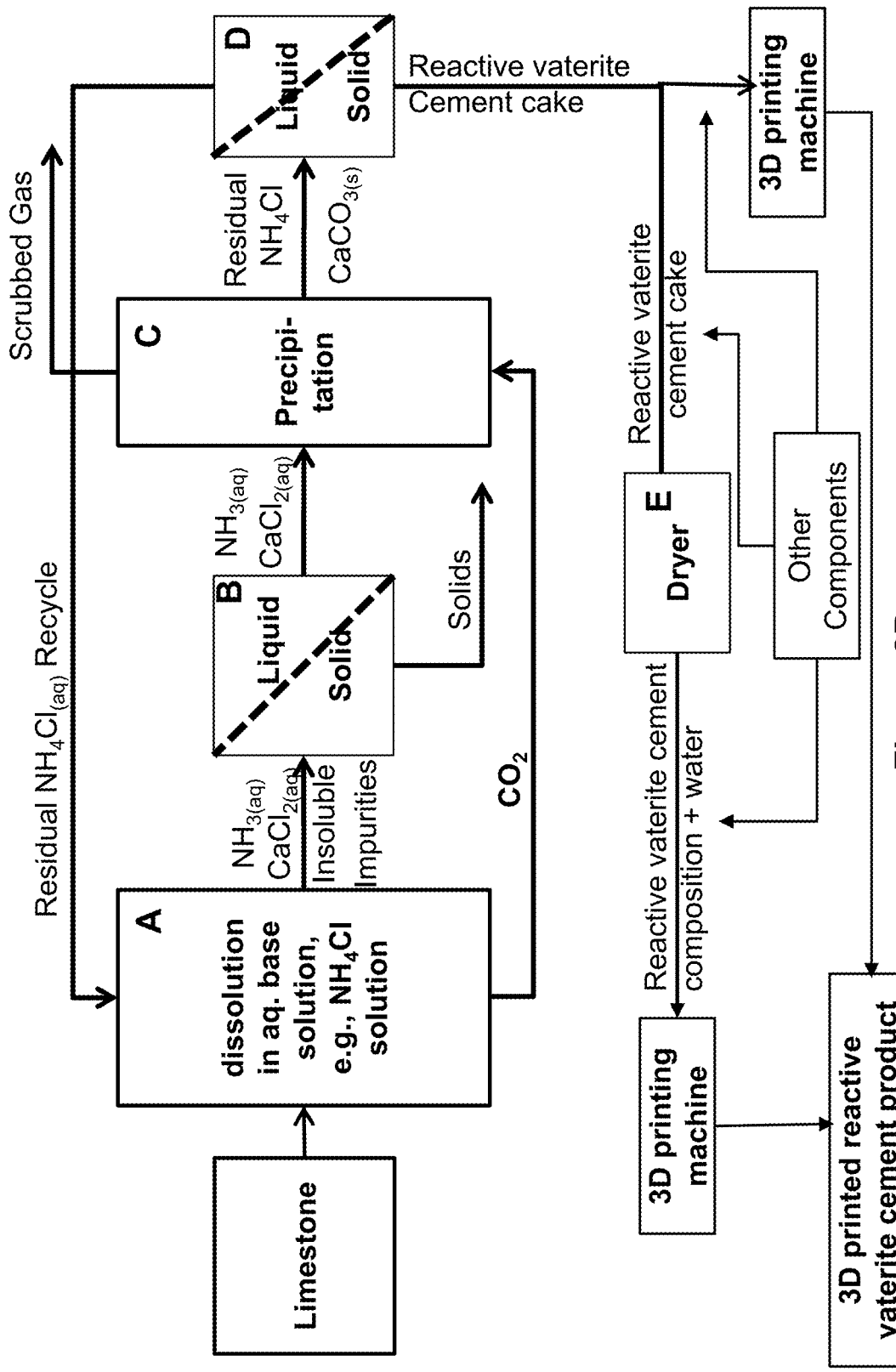
FIG. 2B illustrates some embodiments of the methods and systems provided herein employing limestone directly to form the composition comprising reactive vaterite cement.
Figure 3A:
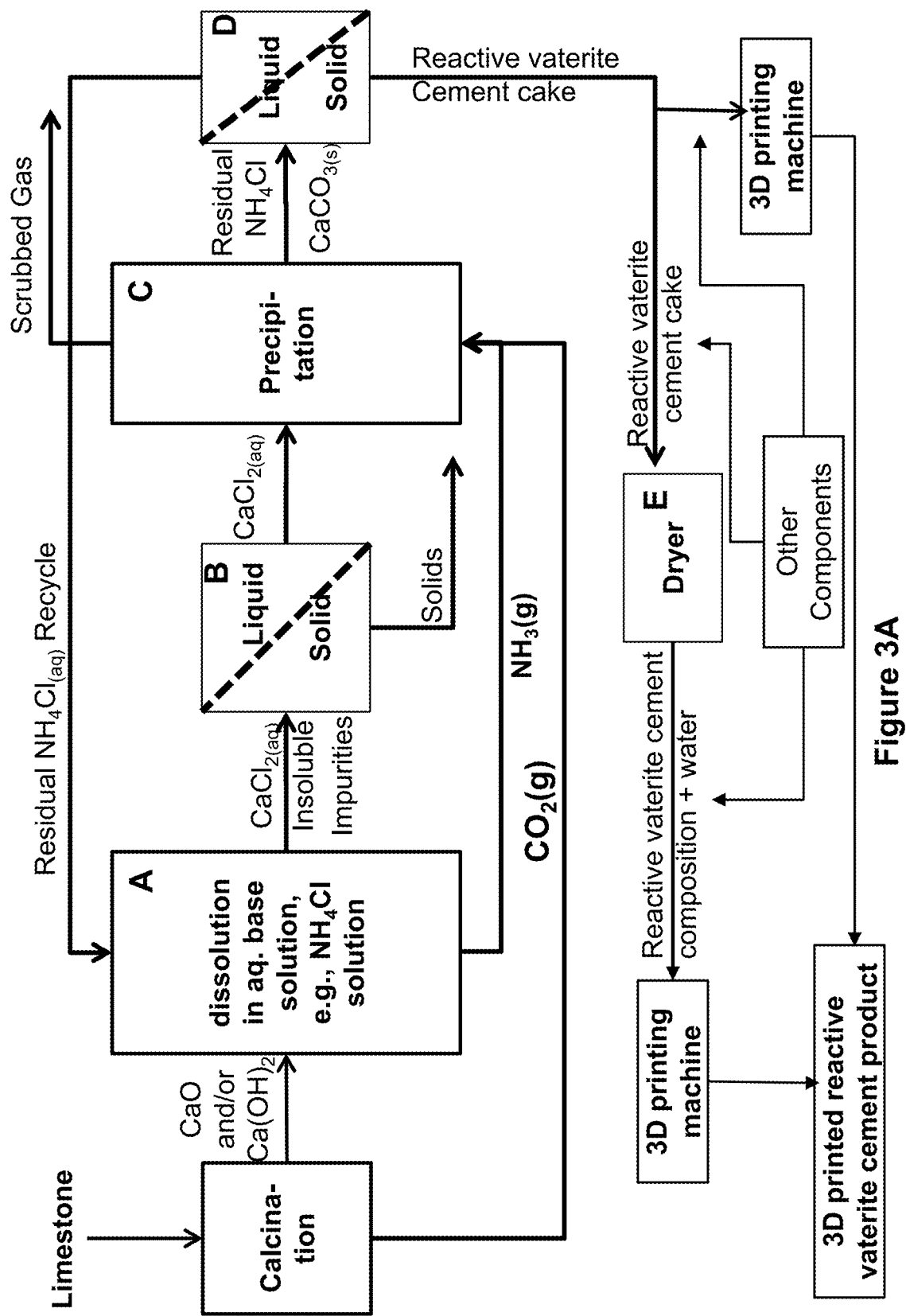
FIG. 3A illustrates some embodiments of the methods and systems provided herein employing calcination of the limestone to form the composition comprising reactive vaterite cement.
Figure 3B:
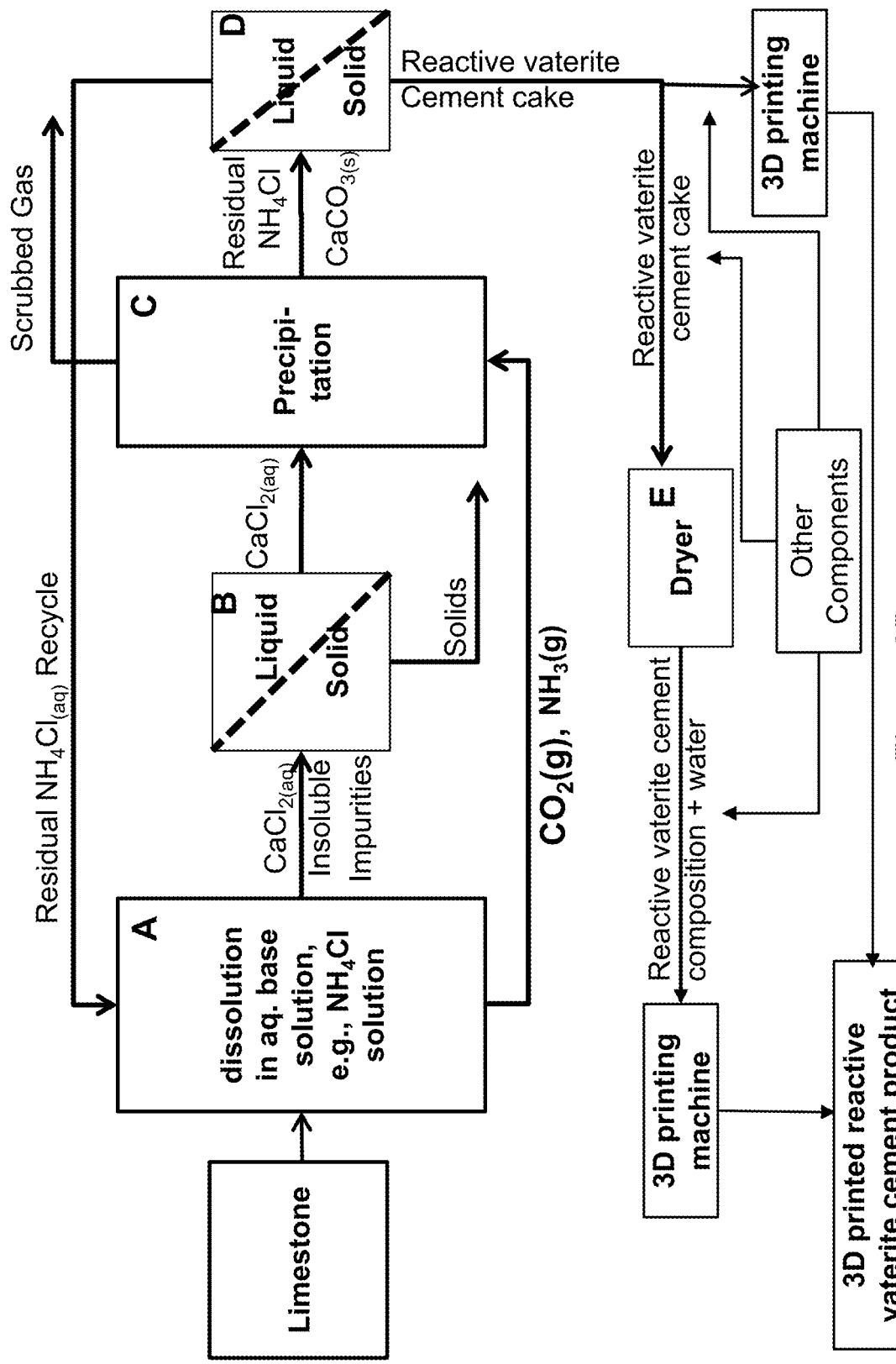
FIG. 3B illustrates some embodiments of the methods and systems provided herein employing limestone directly to form the composition comprising reactive vaterite cement.
Figure 4A:
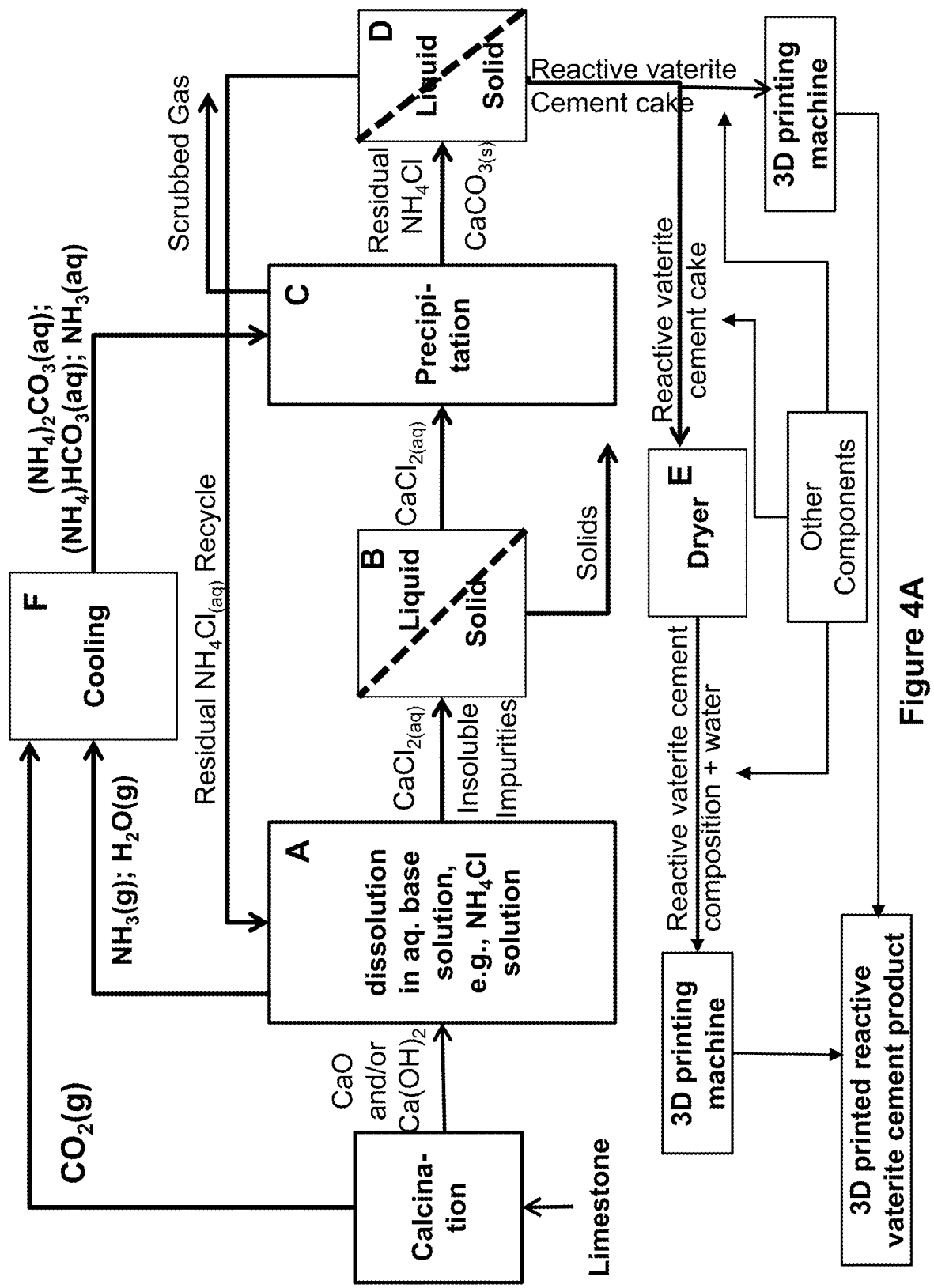
FIG. 4A illustrates some embodiments of the methods and systems provided herein employing calcination of the limestone to form the composition comprising reactive vaterite cement.
Figure 4B:
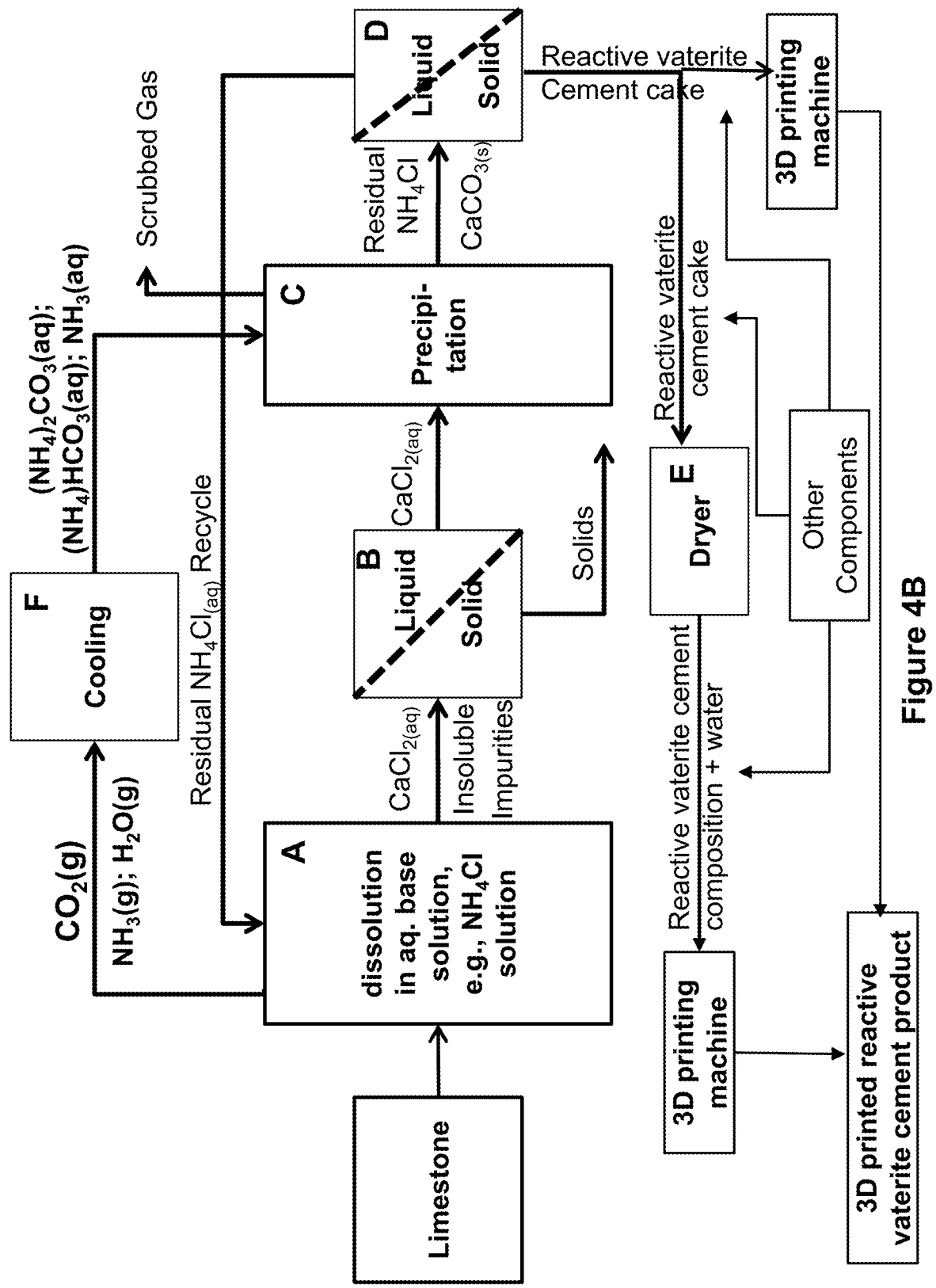
FIG. 4B illustrates some embodiments of the methods and systems provided herein employing limestone directly to form the composition comprising reactive vaterite cement.

In some embodiments, the limestone can be used directly to form the composition comprising reactive vaterite cement (as illustrated in FIGS. 2B, 3B, and 4B) or the limestone may be calcined to form the lime which may be used to form the composition comprising reactive vaterite cement (as illustrated in FIGS. 2A, 3A, and 4A). The aforementioned aspects and embodiments of the methods and systems provided herein are as illustrated in FIGS. 2A, 2B, 3A, 3B, 4A, and 4B. It is to be understood that the steps illustrated in the figures may be modified or the order of the steps may be changed or more steps may be added or deleted depending on the desired outcome.

The calcination or the calcining is a thermal treatment process to bring about a thermal decomposition of the limestone. The "limestone" as used herein, means $CaCO_3$ and may further include other impurities typically present in the limestone. In some embodiments, the limestone further comprises magnesium or magnesium oxide. Limestone is a naturally occurring mineral. The chemical composition of this mineral may vary from region to region as well as between different deposits in the same region. Therefore, the lime containing the calcium oxide and/or the calcium hydroxide obtained from calcining limestone from each natural deposit may be different. Typically, limestone may be composed of calcium carbonate ($CaCO_3$), magnesium carbonate ($MgCO_3$), silica ($SiO_2$), alumina ($Al_2O_3$), iron (Fe), sulphur (S) or other trace elements.

Limestone deposits are widely distributed. The limestone from the various deposits may differ in physical chemical properties and can be classified according to their chemical composition, texture, and geological formation. The limestone may be classified into the following types: high calcium limestone where the carbonate content may be composed mainly of calcium carbonate with a magnesium carbonate content not more than 5%; magnesium limestone containing magnesium carbonate to about 5-35%; or dolomitic limestone which may contain between 35-46% of $MgCO_3$, the balance amount is calcium carbonate. The limestones from different sources may differ considerably in chemical compositions and physical structures. It is to be understood that the methods and systems provided herein apply to all the cement plants calcining the limestone from any of the sources listed above or commercially available. The quarries include, but not limited to, quarries associated with cement kilns, quarries for lime rock for aggregate for use in concrete, quarries for lime rock for other purposes (road base), and/or quarries associated with lime kilns.

The limestone calcination is a decomposition process where the chemical reaction for decomposition of the limestone is:

$$CaCO_3 \rightarrow CaO + CO_2(g)$$

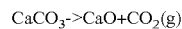

This step is illustrated in FIGS. 2A, 3A, and 4A as a first step of the calcination of the limestone to form the lime. However, in some embodiments, the calcination step can be obviated, and the limestone is used directly as the feed stock (FIGS. 2B, 3B, and 4B).

In some embodiments, the limestone comprises between about 1-70% magnesium and/or a magnesium bearing mineral is mixed with the limestone before the calcination wherein the magnesium bearing mineral comprises between about 1-70% magnesium. In some embodiments, the magnesium upon the calcination forms the magnesium oxide which may be precipitated and/or incorporated in the reactive vaterite cement once formed. In some embodiments, the magnesium bearing mineral comprises magnesium carbonate, magnesium salt, magnesium hydroxide, magnesium silicate, magnesium sulfate, or combination thereof. In some embodiments, the magnesium bearing mineral includes, but not limited to, dolomite, magnesite, brucite, carnallite, talc, olivine, artinite, hydromagnesite, dypingite, barringonite, nesquebonite, lansfordite, kieserite, and combination thereof. In some embodiments, the magnesium oxide in the reactive vaterite cement composition when comes into contact with water, transforms to magnesium hydroxide which may bind with the transformed aragonite and/or calcite.

The "lime" as used herein relates to calcium oxide and/or calcium hydroxide. The presence and amount of the calcium oxide and/or the calcium hydroxide in the lime would vary depending on the conditions for the lime formation. The lime may be in dry form i.e., calcium oxide, and/or in wet form e.g., calcium hydroxide, depending on the conditions. The production of the lime may depend upon the type of kiln, conditions of the calcination, and the nature of the raw material i.e., limestone. At relatively low calcination temperature, products formed in the kiln may contain both un-burnt carbonate and lime and may be called underburnt lime. As the temperature increases, soft burnt or high reactive lime may be produced. At still higher temperatures, dead burnt or low reactive lime may be produced. Soft burnt lime is produced when the reaction front reaches the core of the charged limestone and converts all carbonate present to lime. A high productive product may be relatively soft, contains small lime crystallites and has open porous structure with an easily assessable interior. Such lime may have the optimum properties of high reactivity, high surface area and low bulk density. Increasing the degree of calcination beyond this stage may make lime crystallites to grow larger, agglomerate and sinter. This may result in a decrease in surface area, porosity and reactivity and an increase in bulk density. This product may be known as dead burnt or low reactive lime. Without being limited by any theory, the methods and systems provided herein utilize any one or the combination of the aforementioned lime. Therefore, in some embodiments, the lime is dead burnt, soft burnt, underburnt, or combination thereof.

Production of the lime by calcining the limestone may be carried out using various types of kilns, such as, but not limited to, a shaft kiln or a rotary kiln or an electric kiln. The use of the electric kiln in the calcination and the advantages associated with it, have been described in U.S. application Ser. No. 17/363,537, filed Jun. 30, 2021, which is fully incorporated herein by reference in its entirety.

These apparatuses for the calcining are suitable for calcining the limestone in the form of lumps having diameters of several to tens millimeters. Cement plant waste streams include waste streams from both wet process and dry process plants, which plants may employ shaft kiln, rotary kiln, electric kiln, or combination thereof and may include pre-calciner. These industrial plants may each burn a single fuel or may burn two or more fuels sequentially or simultaneously.

As illustrated in FIGS. 2A, 2B, 3A, 3B, 4A, and 4B, the limestone obtained from the limestone quarry is subjected to the calcination in a cement plant resulting in the formation of the lime and $CO_2$ gas or is used directly. The lime may be calcium oxide in the form of a solid from dry kiln/cement processes and/or may be a combination of calcium oxide and calcium hydroxide in the form of slurry in wet kiln/cement processes. When wet the calcium oxide (also known as a base anhydride that converts in its hydroxide form in water) may be present in its hydrated form such as but not limited to, calcium hydroxide. While calcium hydroxide (also called slaked lime) is a common hydrated form of calcium oxide, other intermediate hydrated and/or water complexes may also be present in the slurry and are all included within the scope of the methods and systems provided herein. It is to be understood that while the lime is illustrated as CaO in some of the figures herein, it may be present as $Ca(OH)_2$ or combination of CaO and $Ca(OH)_2$.

The lime or the limestone may be sparingly soluble in water. In the methods and systems provided herein, the lime or the limestone solubility is increased by its treatment with solubilizers.

In the methods and systems provided herein, the lime or the limestone is solvated or dissolved or solubilized with a solubilizer (step A in FIGS. 2A, 2B, 3A, 3B, 4A, and 4B) under one or more dissolution conditions to produce an aqueous solution comprising calcium salt. For illustration purposes only, the solubilizer, e.g., N-containing salt solution is being illustrated in the figures as ammonium chloride ($NH_4Cl$) solution and the subsequent calcium salt is being illustrated as calcium chloride ($CaCl_2$)). Various examples of the N-containing salt have been provided herein and are all within the scope of the invention.

In some embodiments, the N-containing salt solution solubilizes or dissolves the calcium from the lime or the limestone and leaves the solid impurities. The N-containing salt include without limitation, N-containing inorganic salt, N-containing organic salt, or combination thereof.

The "N-containing inorganic salt" as used herein includes any inorganic salt with nitrogen in it. Examples of N-containing inorganic salt include, but not limited to, ammonium acetate, ammonium halide (halide is any halogen), ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride.

The "N-containing organic salt" as used herein includes any salt of an organic compound with nitrogen in it. Examples of N-containing organic compounds include, but not limited to, aliphatic amine, alicyclic amine, heterocyclic amine, and combination thereof.

The "aliphatic amine" as used herein includes any alkyl amine of formula $(R)_n-NH_{3-n}$ where n is an integer from 1-3, wherein R is independently between C1-C8 linear or branched and substituted or unsubstituted alkyl. An example of the corresponding halide salt (chloride salt, bromide salt, fluoride salt, or iodide salt) of the alkyl amine of formula $(R)_n-NH_{3-n}$ is $(R)_n-NH_{4-n}{}^+Cl^-$. In some embodiments, when R is substituted alkyl, the substituted alkyl is independently substituted with halogen, hydroxyl, acid and/or ester.

For example, when R is alkyl in $(R)_n-NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n-NH_{3-n}$, the substituted alkyl amine is an alkanolamine including, but not limited to, monoalkanolamine, dialkanolamine, or trialkanolamine, such as e.g., monoethanolamine, diethanolamine, or triethanolamine, etc.

For example, when R is substituted alkyl substituted with halogen in $(R)_n-NH_{3-n}$, the substituted alkyl amine is, for example, chloromethylamine, bromomethylamine, chloroethylamine, bromoethylamine, etc.

For example, when R is substituted alkyl substituted with acid in $(R)_n-NH_{3-n}$, the substituted alkyl amine is, for example, amino acid. In some embodiments, the aforementioned amino acid has a polar uncharged alkyl chain, examples include without limitation, serine, threonine, asparagine, glutamine, or combinations thereof. In some embodiments, the aforementioned amino acid has a charged alkyl chain, examples include without limitation, arginine, histidine, lysine, aspartic acid, glutamic acid, or combinations thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is $(R)_n$—$NH_{4-n}^+Cl^-$. Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic ring include, without limitation, pyrrole, pyrrolidine, pyridine, pyrimidine, etc. Such chemicals are well known in the art and are commercially available.

In the methods and systems provided herein, the limestone or the lime is dissolved or solubilized with the N-containing salt solution (step A) to produce the aqueous solution comprising calcium salt. The dissolution step may form ammonia in the aqueous solution (illustrated in FIGS. 2A and 2B) and/or form a gaseous stream comprising ammonia gas (illustrated in FIGS. 3A, 3B, 4A, and 4B).

As illustrated in step A of FIGS. 2A, 3A, and 4A, the N-containing salt is exemplified as ammonium chloride ($NH_4Cl$). The lime is solubilized by treatment with $NH_4Cl$ (new and recycled as further explained below) when the reaction that may occur is:

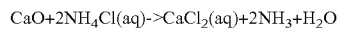
$CaO+2NH_4Cl(aq)->CaCl_2(aq)+2NH_3+H_2O$

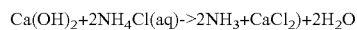
$Ca(OH)_2+2NH_4Cl(aq)->2NH_3+CaCl_2)+2H_2O$

Similarly, when the N-containing salt is N-containing organic salt, the reaction may be shown as below:

$CaO+2NH_3RCl->CaCl_2(aq)+2NH_2R+H_2O$

Similarly, illustrated in step A of FIGS. 2B, 3B, and 4B, the N-containing salt is exemplified as ammonium chloride ($NH_4Cl$). The limestone is solubilized by treatment with $NH_4Cl$ (new and recycled as further explained herein) when the reaction that may occur is:

$CaCO_3(limestone)+2NH_4Cl->CaCl_2)(aq)+2NH_3+CO_2+H_2O$

Similarly, when the base is N-containing organic salt, the reaction may be shown as below:

$CaCO_3(limestone)+2NH_3RCl->CaCl_2)(aq)+2NH_2R+CO_2+H_2O$

In some embodiments, the base or the N-containing inorganic salt such as, but not limited to, an ammonium salt, e.g., ammonium chloride solution may be supplemented with anhydrous ammonia or an aqueous solution of ammonia to maintain an optimum level of ammonium chloride in the solution.

In some embodiments, the aqueous solution comprising calcium salt obtained after the dissolution of the lime or the limestone may contain sulfur depending on the source of the limestone. The sulfur may get introduced into the aqueous solution after the solubilization of the lime or the limestone with any of the N-containing salt described herein. In an alkaline solution, various sulfur compounds containing various sulfur ionic species may be present in the solution including, but not limited to, sulfite ($SO_3^{2-}$), sulfate ($SO_4^{2-}$), hydrosulfide ($HS^-$), thiosulfate ($S_2O_3^{2-}$), polysulfides ($S_n^{2-}$), thiol (RSH), and the like. The sulfur compound as used herein, includes any sulfur ion containing compound.

In some embodiments, the aqueous solution further comprises the N-containing salt, such as, ammonia and/or N-containing inorganic or N-containing organic salt.

In some embodiments, the amount of the N-containing inorganic salt, the N-containing organic salt, or combination thereof, is in more than 20% excess or more than 30% excess to the lime or the limestone. In some embodiments, the molar ratio of the N-containing salt:lime (or N-containing inorganic salt:lime or N-containing organic salt:lime or ammonium chloride:lime) or the molar ratio of the N-containing salt:limestone (or N-containing inorganic salt:limestone or N-containing organic salt:limestone or ammonium chloride:limestone) is between 0.5:1-2:1; or 0.5:1-1.5:1; or 1:1-1.5:1; or 1.5:1; or 2:1; or 2.5:1; or 1:1.

In some embodiments of the methods and systems described herein, one or more dissolution conditions used for the dissolution step are selected from the group consisting of temperature between about 30-200° C., or between about 30-150° C., or between about 30-100° C., or between about 30-75° C., or between about 30-50° C., or between about 40-200° C., or between about 40-150° C., or between about 40-100° C., or between about 40-75° C., or between about 40-50° C., or between about 50-200° C., or between about 50-150° C., or between about 50-100° C.; pressure between about 0.1-50 atm, or between about 0.1-40 atm, or between about 0.1-30 atm, or between about 0.1-20 atm, or between about 0.1-10 atm, or between about 0.5-20 atm; N-containing inorganic or organic salt wt % in water between about 0.5-50%, or between about 0.5-25%, or between about 0.5-10%, or between about 3-30%, or between about 5-20%; or combination thereof.

Agitation may be used to affect dissolution of the lime or the limestone with the N-containing salt solution in the dissolution reactor, for example, by eliminating hot and cold spots to optimize the dissolution/solvation of the lime or the limestone, high shear mixing, wet milling, and/or sonication may be used to break open the lime or the limestone. During or after high shear mixing and/or wet milling, the lime or the limestone suspension may be treated with the N-containing salt solution.

In some embodiments, the dissolution of the lime or the limestone with the N-containing salt solution (illustrated as e.g., ammonium chloride) results in the formation of the aqueous solution comprising calcium salt and solid. In some embodiments, the solid insoluble impurities may be removed from the aqueous solution of the calcium salt (step B in FIGS. 2A, 2B, 3A, 3B, 4A, and 4B) before the aqueous solution is treated with the carbon dioxide in the process. The solid may optionally be removed from the aqueous solution by filtration and/or centrifugation techniques.

It is to be understood that the step B in FIGS. 2A, 2B, 3A, 3B, 4A, and 4B is optional and in some embodiments, the solid may not be removed from the aqueous solution (not shown in the figures) and the aqueous solution containing calcium salt as well as the solid is contacted with the carbon dioxide (in step C in FIGS. 2A, 2B, 3A, 3B, 4A, and 4B) to form the precipitate. In such embodiments, the precipitation material further comprises solid.

In some embodiments, the solid obtained from the dissolution of the lime or the limestone (shown as insoluble impurities in FIGS. 2A, 2B, 3A, 3B, 4A, and 4B) is calcium depleted solid and may be used as a cement substitute (such as a substitute for Portland cement). In some embodiments, the solid comprises silicates, iron oxides, alumina, or combination thereof. The silicate includes, without limitation, clay (phyllosilicate), aluminosilicate, etc.

In some embodiments, the solid is between about 1-85 wt %; or between about 1-80 wt %; or between about 1-75 wt %; or between about 1-70 wt %; or between about 1-60 wt %; or between about 1-50 wt %; or between about 1-40 wt %; or between about 1-30 wt %; or between about 1-20 wt %; or between about 1-10 wt % or between about 1-5 wt %; or between about 1-2 wt %, in the aqueous solution, in the precipitation material, in the 3D printed cement product, or combination thereof.

As illustrated in step C in FIGS. 2A, 2B, 3A, 3B, 4A, and 4B, the aqueous solution comprising calcium salt (and optionally solid) and dissolved ammonia and/or ammonium salt is contacted with the gaseous stream comprising carbon dioxide recycled from the calcination step of the limestone calcination process or the dissolution step of the direct limestone process, to form a precipitation material comprising calcium carbonate, wherein the calcium carbonate comprises reactive vaterite cement, shown in the reaction below:

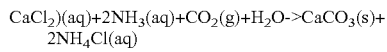
$$CaCl_2)(aq)+2NH_3(aq)+CO_2(g)+H_2O \rightarrow CaCO_3(s)+2NH_4Cl(aq)$$

The absorption of the $CO_2$ into the aqueous solution produces $CO_2$-charged water containing carbonic acid, a species in equilibrium with both bicarbonate and carbonate. The precipitation material is prepared under one or more precipitation conditions (as described herein) suitable to form reactive vaterite cement material.

In one aspect, the ammonia formed in the dissolution step A may be partially or fully present in a gaseous form. This aspect is illustrated in FIGS. 3A and 3B.

In one aspect, there are provided methods to form the composition comprising reactive vaterite cement by (a) calcining the limestone to form the mixture comprising lime and the gaseous stream comprising carbon dioxide; (b) dissolving the mixture comprising lime in the N-containing salt solution to produce the aqueous solution comprising calcium salt, and the gaseous stream comprising ammonia; and (c) treating the aqueous solution comprising calcium salt with the gaseous stream comprising carbon dioxide and the gaseous stream comprising ammonia to form the composition comprising reactive vaterite cement. This aspect is illustrated in FIG. 3A, wherein the gaseous stream comprising $CO_2$ from the calcination step and the gaseous stream comprising $NH_3$ from step A of the process is recirculated to the precipitation reactor (step C) for the formation of the reactive vaterite cement. Remaining steps of FIG. 3A are identical to the steps of FIG. 2A. It is to be understood that the processes of both FIG. 2A and FIG. 3A can also take place simultaneously such that the N-containing salt, such as the N-containing inorganic salt or the N-containing organic salt and optionally ammonia may be partially present in the aqueous solution and partially present in the gaseous stream.

The reaction taking place in the aforementioned aspect may be shown as below:

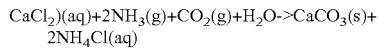
$$CaCl_2)(aq)+2NH_3(g)+CO_2(g)+H_2O \rightarrow CaCO_3(s)+2NH_4Cl(aq)$$

In one aspect, there are provided methods to form the composition comprising reactive vaterite cement by (a) dissolving the limestone in the N-containing salt solution to produce the aqueous solution comprising calcium salt, and the gaseous stream comprising ammonia and the gaseous stream comprising carbon dioxide; and (c) treating the aqueous solution comprising calcium salt with the gaseous stream comprising carbon dioxide and the gaseous stream comprising ammonia to form the composition comprising reactive vaterite cement. This aspect is illustrated in FIG. 3B, wherein the gaseous stream comprising $CO_2$ and the gaseous stream comprising $NH_3$ from step A of the process is recirculated to the precipitation reactor (step C) for the formation of the reactive vaterite cement. Remaining steps of FIG. 3B are identical to the steps of FIG. 2B. It is to be understood that the processes of both FIG. 2B and FIG. 3B can also take place simultaneously such that the N-containing salt, such as the N-containing inorganic salt or the N-containing organic salt and optionally ammonia may be partially present in the aqueous solution and partially present in the gaseous stream.

In some embodiments of the aspects and embodiments provided herein, the gaseous stream comprising ammonia may have ammonia from an external source and/or is recovered and re-circulated from step A of the process.

In some embodiments of the aspects and embodiments provided herein, wherein the gaseous stream comprises ammonia and/or the gaseous stream comprises carbon dioxide, no external source of carbon dioxide and/or ammonia is used, and the process is a closed loop process. Such closed loop process is being illustrated in the figures described herein.

In some embodiments, the dissolution of the lime or the limestone with some of the N-containing organic salt may not result in the formation of ammonia gas or the amount of ammonia gas formed may not be substantial. In embodiments where the ammonia gas is not formed or is not formed in substantial amounts, the methods and systems illustrated in FIGS. 2A and 2B where the aqueous solution comprising calcium salt is treated with the carbon dioxide gas, are applicable. In such embodiments, the organic amine salt may remain in the aqueous solution in fully or partially dissolved state or may separate as an organic amine layer, as shown in the reaction below:

$$CaO+2NH_3R^+Cl^- \rightarrow CaCl_2)(aq)+2NH_2R+H_2O$$

The N-containing organic salt or the N-containing organic compound remaining in the supernatant solution after the precipitation may be called residual N-containing organic salt or residual N-containing organic compound. Methods and systems have been described herein to recover the residual compounds from the precipitate as well as the supernatant solution.

In one aspect, the ammonia gas and the $CO_2$ gas may be recovered and cooled down in a cooling reactor before mixing the cooled solution with the aqueous solution comprising calcium salt. This aspect is illustrated in FIGS. 4A and 4B.

In one aspect, there are provided methods to form the composition comprising reactive vaterite cement by (i) calcining the limestone to form the lime and the gaseous stream comprising carbon dioxide; (ii) dissolving the lime in the aqueous N-containing inorganic salt solution or N-containing organic salt solution to produce the first aqueous solution comprising calcium salt, and the gaseous stream comprising ammonia; (iii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof, and (iv) treating the first aqueous solution comprising calcium salt with the second aqueous solution comprising ammonium bicarbonate, ammonium carbonate, ammonia, ammonium carbamate, or combination thereof to form the composition comprising reactive vaterite cement. This aspect is illustrated in FIG. 4A, wherein the gaseous stream comprising $CO_2$ from the calcination step and the gaseous stream comprising $NH_3$ from step A of the process is recirculated to the cooling reactor/reaction (step F) for the formation of the carbonate and bicarbonate solutions as shown in the reactions further herein below. Remaining steps of FIG. 4A are identical to the steps of FIGS. 2A and 3A.

It is to be understood that the aforementioned aspect illustrated in FIG. 4A may be combined with the aspects illustrated in FIG. 2A and/or FIG. 3A such that the precipitation step C comprises treating the first aqueous solution comprising calcium salt with the second aqueous solution comprising ammonium bicarbonate, ammonium carbonate, ammonia, or combination thereof (illustrated in FIG. 4A), as well as comprises treating the aqueous solution comprising calcium salt with the gaseous stream comprising carbon dioxide (illustrated in FIG. 2A) and/or comprises treating the aqueous solution comprising calcium salt with the gaseous stream comprising carbon dioxide and the gaseous stream comprising ammonia (illustrated in FIG. 3A). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 2A, 3A, and 4A is possible and all are within the scope of this disclosure.

In one aspect, there are provided methods to form the composition comprising reactive vaterite cement by (i) dissolving the limestone in the aqueous N-containing inorganic salt solution or N-containing organic salt solution to produce the first aqueous solution comprising calcium salt, the gaseous stream comprising carbon dioxide and the gaseous stream comprising ammonia; (ii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof; and (iii) treating the first aqueous solution with the second aqueous solution to form the composition comprising reactive vaterite cement. This aspect is illustrated in FIG. 4B, wherein the gaseous stream comprising $CO_2$ and the gaseous stream comprising $NH_3$ from step A of the process are recirculated to the cooling reactor/reaction (step F) for the formation of the carbonate and bicarbonate solutions as shown in the reactions further herein below. Remaining steps of FIG. 4B are identical to the steps of FIGS. 2B and 3B.

It is to be understood that the aforementioned aspect illustrated in FIG. 4B may be combined with the aspects illustrated in FIG. 2B and/or FIG. 3B such that the precipitation step C comprises treating the first aqueous solution comprising calcium salt with the second aqueous solution comprising ammonium bicarbonate, ammonium carbonate, ammonia, ammonium carbamate, or combination thereof (illustrated in FIG. 4B), as well as comprises treating the aqueous solution comprising calcium salt with the gaseous stream comprising carbon dioxide (illustrated in FIG. 2B) and/or comprises treating the aqueous solution comprising calcium salt with the gaseous stream comprising carbon dioxide and the gaseous stream comprising ammonia (illustrated in FIG. 3B). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 2B, 3B, and 4B is possible and all are within the scope of this disclosure.

The ammonium carbamate has a formula $NH_4[H_2NCO_2]$ having ammonium ions $NH_4^+$, and carbamate ions $H_2NCO_2^-$.

The combination of these condensed products in the second aqueous solution may be dependent on the one or more of the cooling conditions.

In some embodiments of the aforementioned aspect and embodiments, the gaseous stream (e.g., the gaseous streams going to the cooling reaction/reactor (step F in FIGS. 4A and 4B)) further comprises water vapor. In some embodiments of the aforementioned aspect and embodiments, the gaseous stream further comprises between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

Intermediate steps in the cooling reaction/reactor may include the formation of ammonium carbonate and/or ammonium bicarbonate and/or ammonium carbamate, by reactions as below:

$$2NH_3 + CO_2 + H_2O \rightarrow (NH_4)_2CO_3$$

$$NH_3 + CO_2 + H_2O \rightarrow (NH_4)HCO_3$$

$$2NH_3 + CO_2 \rightarrow (NH_4)NH_2CO_2$$

Similar reactions may be shown for the N-containing organic salt:

$$2NH_2R + CO_2 + H_2O \rightarrow (NH_3R)_2CO_3$$

$$NH_2R + CO_2 + H_2O \rightarrow (NH_3R)HCO_3$$

An advantage of cooling the ammonia in the cooling reaction/reactor is that ammonia may have a limited vapor pressure in the vapor phase of the dissolution reaction. By reacting the ammonia with $CO_2$, as shown in the reactions above, can remove some ammonia from the vapor space, allowing more ammonia to leave the dissolution solution.

The second aqueous solution comprising ammonium bicarbonate, ammonium carbonate, ammonia, ammonium carbamate, or combination thereof (exiting the cooling reaction/reactor in FIGS. 4A and 4B) is then treated with the first aqueous solution comprising calcium salt from the dissolution reaction/reactor, in the precipitation reaction/reactor (step C) to form the precipitation material comprising reactive vaterite cement:

$(NH_4)_2CO_3+CaCl_2)\text{->}CaCO_3(vaterite)+2NH_4Cl$ $(NH_4)HCO_3+NH_3+CaCl_2)\text{->}CaCO_3(vaterite)+2NH_4Cl+H_2O$ $2(NH_4)HCO_3+CaCl_2)\text{->}CaCO_3(vaterite)+2NH_4Cl+H_2O+CO_2$ $(NH_4)NH_2CO_2+H_2O+CaCl_2)\text{->}CaCO_3(vaterite)+2NH_4Cl$ In some embodiments of the aspects and embodiments provided herein, the one or more cooling conditions comprise temperature between about 0-200° C., or between about 0-150° C., or between about 0-75° C., or between about 0-100° C., or between about 0-80° C., or between about 0-60° C., or between about 0-50° C., or between about 0-40° C., or between about 0-30° C., or between about 0-20° C., or between about 0-10° C.

In some embodiments of the aspects and embodiments provided herein, the one or more cooling conditions comprise pressure between about 0.5-50 atm; or between about 0.5-25 atm; or between about 0.5-10 atm; or between about 0.1-10 atm; or between about 0.5-1.5 atm; or between about 0.3-3 atm.

In some embodiments, the formation and the quality of the reactive vaterite formed in the methods and systems provided herein, is dependent on the amount and/or the ratio of the condensed products in the second aqueous solution comprising ammonium bicarbonate, ammonium carbonate, ammonia, ammonium carbamate, or combination thereof.

In some embodiments, the presence or absence or distribution of the condensed products in the second aqueous solution comprising ammonium bicarbonate, ammonium carbonate, ammonia, ammonium carbamate, or combination thereof, can be optimized in order to maximize the formation of the reactive vaterite and/or to obtain a desired particle size distribution. This optimization can be based on the one or more cooling conditions, such as, pH of the aqueous solution in the cooling reactor, flow rate of the $CO_2$ and the $NH_3$ gases, and/or ratio of the $CO_2:NH_3$ gases. The inlets for the cooling reactor may be carbon dioxide ($CO_{2(g)}$), the dissolution reactor gas exhaust containing ammonia ($NH_{3(g)}$), water vapor, and optionally fresh makeup water (or some other dilute water stream). The outlet may be a slipstream of the reactor's recirculating fluid (the second aqueous solution), which is directed to the precipitation reactor for contacting with the aqueous solution and optionally additional carbon dioxide and/or ammonia. The pH of the system may be controlled by regulating the flow rate of $CO_2$ and $NH_3$ into the cooling reactor. The conductivity of the system may be controlled by addition of dilute makeup water to the cooling reactor. Volume may be maintained constant by using a level detector in the cooling reactor or it's reservoir.

It is to be understood that while FIGS. 4A and 4B illustrate a separate cooling reaction/reactor, in some embodiments, the dissolution reaction/reactor may be integrated with the cooling reaction/reactor. For example, the dissolution reactor may be integrated with a condenser acting as a cooling reactor. Various configurations of the integrated reactor described above, are described in U.S. application Ser. No. 17/184,933, filed Feb. 25, 2021, which is incorporated herein by reference in its entirety.

In the aforementioned aspects, both the dissolution and the cooling reactors are fitted with inlets and outlets to receive the required gases and collect the aqueous streams. In some embodiments of the aforementioned aspect, the dissolution reactor comprises a stirrer to mix the lime or the limestone with the aqueous N-containing salt solution. The stirrer can also facilitate upward movement of the gases. In some embodiments of the aforementioned aspect, the dissolution reactor is configured to collect the solid settled at the bottom of the reactor after removing the first aqueous solution comprising calcium salt. In some embodiments of the aforementioned aspect, the cooling tower comprises one or more trays configured to catch and collect the condensed second aqueous solution and prevent it from falling back into the dissolution reactor. As such, the cooling/condensation may be accomplished through use of infusers, bubblers, fluidic Venturi reactors, spargers, gas filters, sprays, trays, or packed column reactors, and the like.

In some embodiments, the contacting of the aqueous solution comprising calcium salt with carbon dioxide and optionally ammonia or second aqueous solution is achieved by contacting the aqueous solution to achieve and maintain a desired pH range, a desired temperature range, and/or desired divalent cation concentration using a convenient protocol as described herein (precipitation conditions). In some embodiments, the systems include a precipitation reactor configured to contact the aqueous solution comprising calcium salt with carbon dioxide and optionally ammonia from step A of the process or the systems include a precipitation reactor configured to contact the first aqueous solution comprising calcium salt with the second aqueous solution comprising ammonium bicarbonate, ammonium carbonate, ammonia, ammonium carbamate, or combination thereof.

In some embodiments, the aqueous solution comprising calcium salt may be placed in a precipitation reactor, wherein the amount of the aqueous solution comprising calcium salt added is sufficient to raise the pH to a desired level (e.g., a pH that induces precipitation of the precipitation material) such as pH 7-9, pH 7-8.7, pH 7-8.5, pH 7-8, pH 7.5-8, pH 8-8.5, pH 8.5-9, pH 9-14, pH 10-14, pH 11-14, pH 12-14, or pH 13-14. In some embodiments, the pH of the aqueous solution comprising calcium salt when contacted with the carbon dioxide and optionally the $NH_3$ or the second aqueous solution, is maintained at between 7-9 or between 7-8.7 or between 7-8.5 or between 7.5-8.5 or between 7-8, or between 7.6-8.5, or between 8-8.5, or between 7.5-9.5 in order to form the reactive vaterite.

The aqueous solution comprising calcium salt may be contacted with the gaseous stream comprising the $CO_2$ and optionally the $NH_3$ using any convenient protocol. The contact protocols of interest include, but not limited to, direct contacting protocol (e.g., bubbling the gases through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the gases and the liquid sheet move in countercurrent, co-current, or crosscurrent directions, or in any other suitable manner. In some embodiments, gas-liquid contact is accomplished by contacting liquid droplets of the solution having an average diameter of 500 micrometers or less, such as 100 micrometers or less, with the gas source.

Any number of the gas-liquid contacting protocols described herein may be utilized. Gas-liquid contact or the liquid-liquid contact is continued until the pH of the precipitation reaction mixture is optimum (various optimum pH values have been described herein to form the precipitation material comprising e.g., reactive vaterite), after which the precipitation reaction mixture is allowed to stir. The rate at which the pH drops may be controlled by addition of more of the aqueous solution comprising calcium salt during gas-liquid contact or the liquid-liquid contact. In addition, additional aqueous solution may be added after sparging to raise the pH back to basic levels for precipitation of a portion or all the precipitation material. In any case, the precipitation material may be formed upon removing protons from certain species in the precipitation reaction mixture. The precipitation material comprising carbonate may then be separated and optionally, further processed.

The one or more precipitation conditions include those that modulate the environment of the precipitation reaction mixture to produce the desired precipitation material comprising reactive vaterite. Such one or more precipitation conditions include, but not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystal, catalysts, membranes, or substrate, dewatering, drying, ball milling, etc. In some embodiments, the average particle size of the reactive vaterite may also depend on the one or more precipitation conditions used in the precipitation of the precipitation material.

For example, the temperature of the precipitation reaction may be raised to a point at which an amount suitable for precipitation of the desired precipitation material occurs. In such embodiments, the temperature of the precipitation reaction may be raised to a value, such as from 20° C. to 60° C., and including from 25° C. to 60° C.; or from 30° C. to 60° C.; or from 35° C. to 60° C.; or from 40° C. to 60° C.; or from 50° C. to 60° C.; or from 25° C. to 50° C.; or from 30° C. to 50° C.; or from 35° C. to 50° C.; or from 40° C. to 50° C.; or from 25° C. to 40° C.; or from 30° C. to 40° C.; or from 25° C. to 30° C. In some embodiments, the temperature of the precipitation reaction may be raised using energy generated from low or zero carbon dioxide emission sources (e.g., solar energy source, wind energy source, hydroelectric energy source, waste heat from the flue gases of the carbon emitter, etc.).

The pH of the precipitation reaction may also be raised to an amount suitable for the precipitation of the desired precipitation material. In such embodiments, the pH of the precipitation reaction may be raised to alkaline levels for precipitation. In some embodiments, the precipitation conditions required to form the precipitation material include pH higher than 7 or pH of 8 or pH of between 7.1-8.5 or pH of between 7.5-8 or between 7.5-8.5 or between 8-8.5 or between 8-9 or between 7.6-8.4, in order to form the precipitation material. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

In some embodiments, the one or more precipitation conditions to produce the desired precipitation material from the precipitation reaction may include, as above, the temperature and pH, as well as, in some instances, the concentrations of additive and ionic species in the water. The additives have been described herein below. The presence of the additive and the concentration of the additive may also favor formation of the reactive vaterite. In some embodiments, a middle chain or long chain fatty acid ester may be added to the aqueous solution during the precipitation to form the reactive vaterite cement. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combination thereof. In some embodiments, a combination of stearate and citrate may be added during the precipitation step of the process to form the reactive vaterite cement.

In some embodiments, the gas leaving the precipitation reactor (shown as "scrubbed gas" in the figures) passes to a gas treatment unit for a scrubbing process. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

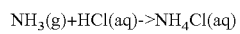

$$NH_3(g) + HCl(aq) \rightarrow NH_4Cl(aq)$$

The $NH_4Cl$ (aq) from the HCl scrubber may be recycled to the dissolution step A.

In some embodiments, the gas exhaust stream comprising ammonia (shown as "scrubbed gas" in the figures) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_{2(g)}$), the reactor gas exhaust containing ammonia ($N_{3(g)}$), and fresh makeup water (or some other dilute water stream). The outlet may be a slipstream of the scrubber's recirculating fluid (e.g. $H_3N-CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber.

In some embodiments, the methods and systems provided herein further include separating the precipitation material (step D in FIGS. 2A, 2B, 3A, 3B, 4A, and 4B) from the aqueous solution by dewatering to form reactive vaterite cement cake or wet form or slurry form of the reactive vaterite cement. The reactive vaterite cement cake may be subjected optionally to rinsing, and optionally drying (step E in FIGS. 2A, 2B, 3A, 3B, 4A, and 4B). The cake form or the wet form or the slurry form or the dried composition comprising reactive vaterite cement may optionally be mixed with water and/or other components to form a blended composition comprising reactive vaterite cement and the other components and sent to the 3D printing machine system to print the 3D printed reactive vaterite cement product (shown in FIGS. 2A, 2B, 3A, 3B, 4A, and 4B) and further the 3D printed cement product after curing. In some embodiments, the reactive vaterite cement cake may not be dried and may be sent as is to the 3D printing machine system to make the 3D printed reactive vaterite cement product (shown in FIGS. 2A, 2B, 3A, 3B, 4A, and 4B) and further the 3D printed cement product after curing.

The methods and systems provided herein may result in residual N-containing salt such as the residual N-containing inorganic or N-containing organic salt, e.g., residual ammonium salt remaining in the supernatant solution as well as in the precipitate itself after the formation of the precipitate. The residual base such as the N-containing inorganic or N-containing organic salt, e.g., residual ammonium salt (e.g., residual $NH_4Cl$) as used herein includes any salt that may be formed by ammonium ions and anions present in the solution including, but not limited to halogen ions such as chloride ion, nitrate or nitrite ion, and sulfur ion such as, sulfate ion, sulfite ion, thiosulfate ion, hydrosulfide ion, and the like. In some embodiments, the residual N-containing inorganic salt comprises ammonium halide, ammonium acetate, ammonium sulfate, ammonium sulfite, ammonium hydrosulfide, ammonium thiosulfate, ammonium nitrate, ammonium nitrite, or combinations thereof. These residual salts may be removed and optionally recovered from the supernatant solution as well as the precipitate. In some embodiments, the supernatant solution further comprising the N-containing inorganic or N-containing organic salt, e.g., residual ammonium salt (e.g., residual $NH_4Cl$), is recycled back to the dissolution reactor for the dissolution of the lime or the limestone (to step A in FIGS. 2A, 2B, 3A, 3B, 4A, and 4B).

The cake comprising reactive vaterite cement may be sent to the dryer (step E in FIGS. 2A, 2B, 3A, 3B, 4A, and 4B) to form dry powder composition comprising reactive vaterite cement. The powder form of the reactive vaterite cement may be used further in applications to form 3D printed cement products, as described herein. The cake may be dried using any drying techniques known in the art such as, but not limited to fluid bed dryer or swirl fluidizer. The resulting solid powder may be then mixed with one or more of the other components such as, aluminosilicate material, SCM, e.g., limestone, Portland cement clinker, admixture, accelerator, additive, or mixture thereof to make different reactive vaterite cement compositions described herein. In some embodiments, the slurry form with reduced water or the cake form of the reactive vaterite cement composition is directly used to form the 3D printed cement product, as described herein.

Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate.

The reactive vaterite cement in the 3D printed reactive vaterite cement product (optionally including solid from step B as described herein) undergoes curing and transformation to the aragonite and/or the calcite and sets and hardens into 3D printed cement product. In some embodiments, the solid may get incorporated in the 3D printed cement product.

In the systems provided herein, the separation or dewatering step D may be carried out on the separation station. The cake or the precipitate comprising reactive vaterite cement may be stored in the supernatant for a period of time following precipitation and prior to separation. For example, the precipitate comprising reactive vaterite cement may be stored in the supernatant for a period of time ranging from few min to hours to 1 to 1000 days or longer, such as 1 to 10 days or longer, at a temperature ranging from 1° C. to 40° C., such as 20° C. to 25° C. Separation or dewatering may be achieved using any of a number of convenient approaches, including draining (e.g., gravitational sedimentation of the precipitate comprising reactive vaterite cement followed by draining), decanting, filtering (e.g., gravity filtration, vacuum filtration, filtration using forced air), centrifuging, pressing, or any combination thereof. Separation of the bulk water from the precipitate comprising reactive vaterite cement produces a wet cake of the composition comprising reactive vaterite cement, or a dewatered composition comprising reactive vaterite cement. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the composition comprising reactive vaterite cement.

For some 3D printed cement products, it may be desired that the composition transforms rapidly and in certain other instance, a slow transformation may be desired. In some embodiments, the 3D printed reactive vaterite cement product may be heated on the conveyer belt (an example of the material chamber) to hasten the transformation of the reactive vaterite to the aragonite and/or the calcite. In some embodiments, the 3D printed reactive vaterite cement product may be heated in the autoclave (an example of the material chamber) to hasten the transformation of the reactive vaterite to the aragonite and/or the calcite. These 3D printed reactive vaterite cement products may be cured, e.g., by placing in the one or more material chambers where they are subjected to high levels of humidity, pressure, and/or heat, etc. The combination of the curing conditions, such as the pressure, the temperature, the relative humidity, and the time of exposure, etc., can be varied according to the thickness of the 3D printed cement product and the desired results.

In some embodiments, the composition comprising reactive vaterite cement may be activated such that the reactive vaterite cement leads to aragonitic pathway and not calcite pathway during dissolution-re-precipitation process. In some embodiments, the reactive vaterite cement composition is activated in such a way that after the dissolution-re-precipitation process, the aragonite formation is enhanced, and the calcite formation is suppressed. The activation of the composition comprising reactive vaterite cement may result in control over the aragonite formation and crystal growth. Various examples of the activation of the composition comprising reactive vaterite cement, such as, but not limited to, nuclei activation, thermal activation, mechanical activation, chemical activation, or combination thereof, are described herein. In some embodiments, the reactive vaterite is activated through various processes such that the aragonite and/or the calcite formation and its morphology and/or crystal growth can be controlled upon reaction of the reactive vaterite cement composition with water. The aragonite and/or the calcite formed results in higher tensile strength and fracture tolerance to the products formed from the reactive vaterite cement.

In some embodiments, the reactive vaterite cement may be activated by mechanical means, as described herein. For example, the reactive vaterite cement composition may be activated by creating surface defects on the vaterite composition such that the aragonite formation is accelerated. In some embodiments, the activated vaterite is a ball-milled reactive vaterite or is a reactive vaterite with surface defects such that aragonite and/or calcite formation pathway is facilitated.

The reactive vaterite cement composition may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, lime, hard skeletal material of certain fresh-water and marine invertebrate organism, including pelecypod, gastropod, mollusk shell, and calcareous endoskeleton of warm- and cold-water coral, pearl, rock, sediment, ore mineral (e.g., serpentine), and the like. The synthetic sources include, but not limited to, precipitated aragonite, such as formed from sodium carbonate and calcium chloride; or aragonite formed by the transformation of the reactive vaterite to the aragonite, such as transformed reactive vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

During the mixing of the reactive vaterite cement composition optionally with other components as mentioned herein and mixing with the aqueous medium, the reactive vaterite cement composition may be subjected to high shear mixer (in the mixer system). The components of the reactive vaterite cement composition can be blended using any suitable protocol. Each material may be mixed at the time of work, or part of or all of the materials may be mixed in advance. As a mixing apparatus, any conventional apparatus can be used. For example, Hobart mixer, slant cylinder mixer, Omni Mixer, Henschel mixer, V-type mixer, and Nauta mixer can be employed.

The methods and systems provided herein further comprise a control system configured to remotely and/or automatedly control the mixer system, the feed system, the 3D printing machine, the vibrator system, and/or the material chamber.

The methods and systems may also include one or more detectors configured for monitoring the reactive vaterite cement composition and its printing. Monitoring may include, but is not limited to, collecting data about the pressure, temperature, humidity, and composition. The detectors may be any convenient device configured to monitor, for example, pressure sensor (e.g., electromagnetic pressure sensor, potentiometric pressure sensor, etc.), temperature sensor (resistance temperature detector, thermocouple, gas thermometer, thermistor, pyrometer, infrared radiation sensor, etc.), volume sensor (e.g., geophysical diffraction tomography, X-ray tomography, hydroacoustic surveyer, etc.), and device for determining chemical makeup of the composition (e.g., IR spectrometer, NMR spectrometer, UV-vis spectrophotometer, high performance liquid chromatograph, inductively coupled plasma emission spectrometer, inductively coupled plasma mass spectrometer, ion chromatograph, X-ray diffractometer, gas chromatograph, gas chromatography-mass spectrometer, flow-injection analysis, scintillation counter, acidimetric titration, and flame emission spectrometer, etc.).

In some embodiments, detectors may also include a computer interface which is configured to provide a user with the collected data about the printing of the composition. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters at regular intervals, e.g., determining the composition every 1 minute, every 5 minutes, every 10 minutes, every 30 minutes, every 60 minutes, every 100 minutes, every 200 minutes, every 500 minutes, or some other interval.

In some embodiments, the systems may include a control station, configured to control the mixing system, the feed system, the 3D printing machine system, the vibrator system, and/or the material chamber. A control station may include a set of valves or multi-valve systems which are manually, mechanically, or digitally controlled, or may employ any other convenient flow regulator protocol. In some instances, the control station may include a computer interface, (where regulation is computer-assisted or is entirely controlled by computer) configured to provide a user with input and output parameters to control the 3D printing, as described above.

IV. 3D Printed Cement Product

In some embodiments, the 3D printed cement product formed from the compositions provided herein, is a building material. The "building material" used herein includes material used in construction. Examples of such structures or the building materials include, but are not limited to, building, driveway, foundation, kitchen slab, furniture, pavement, road, bridges, motorway, overpass, parking structure, brick, block, wall, footing for a gate, fence, pole, or module thereof.

In some embodiments, the 3D printed cement product formed from the compositions provided herein, is a formed building material. The "formed building material" used herein includes materials shaped into structures with defined physical shape.

Examples of the formed building materials that can be produced by the foregoing methods and systems, include, but not limited to, masonry unit, for example only, brick, block, and tile including, but not limited to, ceiling tile; construction panel, for example only, cement board and/or drywall; conduit; basin; beam; column, slab; acoustic barrier; insulation material; or combination thereof. Construction panels are formed building materials employed in a broad sense to refer to any non-load-bearing structural element that are characterized such that their length and width are substantially greater than their thickness. As such the panel may be a plank, a board, shingle, and/or tile. The dimension of the construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board, fiberglass-faced or glass mat-faced board (e.g., surface reinforcement with glass fiber mat), fiberglass mesh reinforced board (e.g., surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment. The cement boards are formed building materials which in some embodiments, are used as backer boards for ceramics that may be employed behind bathroom tiles, kitchen counters, backsplashes, etc. and may have lengths ranging from 100 to 200 cm. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas).

Another type of construction panel formed from the 3D printing described herein is backer board. The backer board may be used for the construction of interior, and/or exterior floors, walls, and ceilings. Another type of construction panel formed from the compositions provided herein is drywall. The drywall includes board that is used for construction of interior, and/or exterior floors, walls, and ceilings. One of the applications of the cement board or drywall is fiber cement siding.

In some embodiments, the formed building materials are masonry units. Masonry units are formed building materials used in the construction of load-bearing and non-load-bearing structures that are generally assembled using mortar, grout, and the like. Exemplary masonry units formed from the 3D printing include bricks, blocks, and tiles.

Another formed building material formed from the 3D printing described herein is a conduit. Conduits are tubes or analogous structures configured to convey a gas or liquid, from one location to another. Conduits can include any number of different structures used in the conveyance of a liquid or gas that include, but are not limited to, pipes, culverts, box culverts, drainage channels and portals, inlet structures, intake towers, gate wells, outlet structures, and the like.

Another formed building material formed from the 3D printing described herein is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material formed from the 3D printing described herein is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways, and cantilevers.

Another formed building material formed from the 3D printing described herein is a column, which, in a broad sense, refers to a vertical load-bearing structure that carries loads chiefly through axial compression and includes structural elements such as compression members. Other vertical compression members may include, but are not limited to pillars, piers, pedestals, or posts.

Another formed building material formed from the 3D printing described herein is a concrete slab. Concrete slabs are those building materials used in the construction of prefabricated foundations, floors, and wall panels. In some instances, a concrete slab may be employed as a floor unit (e.g., hollow plank unit or double tee design).

Another formed building material formed from the 3D printing described herein is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material formed from the 3D printing described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollow core product; light pole base; meter box; panel vault; pull box; telecom structure; transformer pad; transformer vault; trench; utility vault; utility pole; controlled environment vaults; underground vault; mausoleum; grave stone; coffin; Haz mat storage container; detention vaults; catch basins; manholes; aeration system; distribution box; dosing tank; dry well; grease interceptor; leaching pit; sand-oil/oil-water interceptor; septic tank; water/sewage storage tank; wet wells; fire cisterns; floating dock; underwater infrastructure; decking; railing; sea walls; roofing tiles; pavers; community retaining wall; res. retaining wall; modular block systems; and segmental retaining walls.

In some embodiments, the methods and systems described herein include making artificial marine structure from the 3D printing described herein including, but not limited to, artificial coral and reef. In some embodiments, the artificial structure can be used in the aquarium or sea. In some embodiments, the aragonitic cement and/or calcite provides neutral or close to neutral pH which may be conducive for maintenance and growth of marine life. The aragonitic reef may provide suitable habitat for marine species.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a process described herein can be combined in a variety of ways without departing from the spirit and scope of the present invention, whether explicit or implicit herein. For example, where reference is made to a particular composition, that composition can be used in various embodiments of compositions of the present invention and/or in processes of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

Certain ranges are presented herein with numerical values being preceded by the term "about." The term "about" is used herein to provide literal support for the exact number that it precedes, as well as a number that is near to or approximately the number that the term precedes. As used herein, the term "about" refers to a ±10% variation from the nominal value unless otherwise indicated or inferred.

Unless defined otherwise, all technical and scientific terms used herein have the same meaning as commonly understood by one of ordinary skill in the art to which this invention belongs. Although any processes and materials similar or equivalent to those described herein can also be used in the practice or testing of the invention, representative illustrative processes and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

It is noted that, as used herein and in the appended claims, the singular forms "a", "an", and "the" include plural references unless the context clearly dictates otherwise. For example, where the plural form is used for compounds, salts, and the like, this is taken to mean also a single compound, salt, or the like. It is further noted that the claims may be drafted to exclude any optional element.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited process can be carried out in the order of events recited or in any other order, which is logically possible. It should be understood that the order of steps or order for performing certain actions is immaterial so long as the present invention remain operable. Moreover, two or more steps or actions may be conducted simultaneously.

The following examples are put forth to provide those of ordinary skill in the art with a complete disclosure and description of how to make and use the invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for.

EXAMPLES

Example 1

3D Printing an Object Using the Reactive Vaterite Cement Composition $NH_4Cl$ is dissolved into water. Lime is added to the aqueous solution and mixed at 80° C. in a vessel with a vapor outlet tube. Vapor leaves the vessel through the outlet tube and is condensed along with $CO_2$ at 20° C. to form an aqueous solution containing ammonia, ammonium bicarbonate, and ammonium carbonate in a first airtight and collapsible bag. The solid and liquid mixture remaining in the vessel is cooled to 20° C. and vacuum filtered to remove the insoluble impurities. The clear $CaCl_2$-containing filtrate is transferred to a second airtight and collapsible bag. Both bags are submersed in a water bath, which preheats the solutions to 35° C. The precipitation reactor is an acrylic cylinder equipped with baffles, pH electrode, thermocouple, turbine impeller, and inlet and outlet ports for liquid feeds and product slurry. During startup, the $CaCl_2$-containing solution in the second bag is pumped into the reactor at a fixed flow rate. The mixer is stirred while the solution in the first bag is introduced by a separate pump. A computer automated control loop controls the continuous inlet flow of the ammonium carbonate-containing solution from the first bag maintaining the pH between 7-9. Reactive vaterite slurry is formed. The resultant reactive vaterite slurry is continuously collected into a holding container. The slurry is vacuum filtered. The reactive vaterite filter cake is oven dried at 100° C. The cake shows 100% vaterite with a mean particle size of 5 microns. The clear filtrate containing regenerated $NH_4Cl$ is recycled in subsequent experiments.

The dried reactive vaterite cement composition is mixed with water into a paste. The composition is fed into a 3D printing machine which is programmed to print an object. The 3D printing machine prints the object which is set and hardened in a humidity chamber set to 60° C. and 80% of relative humidity for 7 days. Destructive testing determines the compressive strength of the 3D printed object to be 4600 psi (~31 MPa).

Example 2

Effect of the Bimodal Distribution on the Flow and Strength of the Reactive Vaterite Cement Binary cement mortars were mixed and cast according to ASTM C305 and C109. The sand to cement ratio was 2.75, and the water to cementitious materials ratio was 0.485. The Portland cement utilized conformed to ASTM C150 as a Type II/V cement. Twenty percent of the cementitious materials was replaced by the reactive vaterite cement. The five binary cement blends tested are presented in Table 1. All cementitious materials were preblended to uniformity prior to mixing. The mixing procedure was to combine the cement blend and water in a 5-quart Hobart stand mixer and mix on low for 30 seconds. The sand was then introduced over 30 seconds while continuing to mix on low. The speed was then increased to medium for 30 seconds. The mixer was then stopped for 90 seconds and scrapped down for 15 seconds loosening any material stuck to the mixing bowl and paddle. After scrape down, the mixer bowl was covered until mixing resumed for 1 additional minute at medium speed. The mortar was then immediately tested for flow according to ASTM C1437, then remixed at medium for 15 seconds before casting 2" mortar cubes. The mortar cubes were then stored at 23° C. and 98% relative humidity. After 24 hours of curing the mortars were demolded and moved to a saturated lime bath until testing at 3, 7, 28, and 56 days for compressive strength according to ASTM C109. Three mortar cubes were tested at each age.

TABLE 1

Binary mortar mixes containing unimodal and bimodal particle distribution

| Mix # | Portland cement (g) | 5 μm Reactive vaterite (g) | 16 μm Reactive vaterite (g) | Sand (g) | Water (g) |
|---|---|---|---|---|---|
| 1 | 400 | 100 | 0 | 1375 | 242 |
| 2 | 400 | 75 | 25 | 1375 | 242 |
| 3 | 400 | 50 | 50 | 1375 | 242 |
| 4 | 400 | 25 | 75 | 1375 | 242 |
| 5 | 400 | 0 | 100 | 1375 | 242 |

Figure 5:
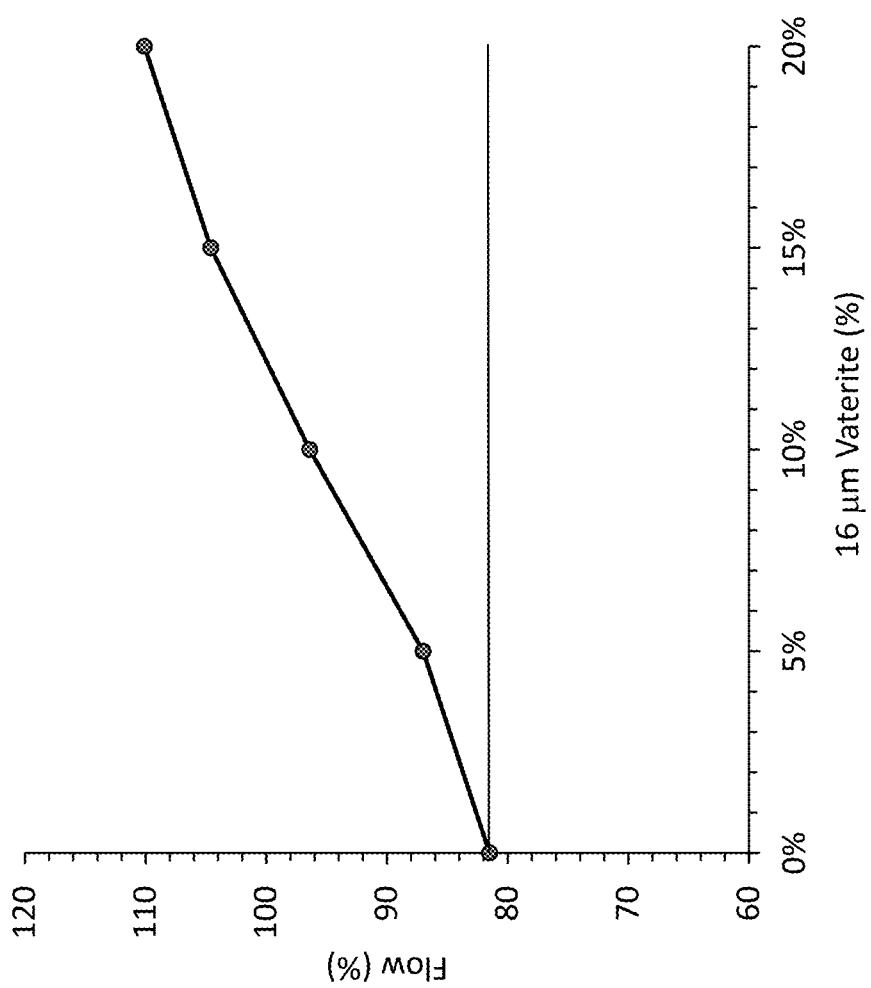
FIG. 5 illustrates effect of the bimodal distribution of the reactive vaterite cement particles on the flow of the mortar, as described in Example 2 herein.
Figure 6:
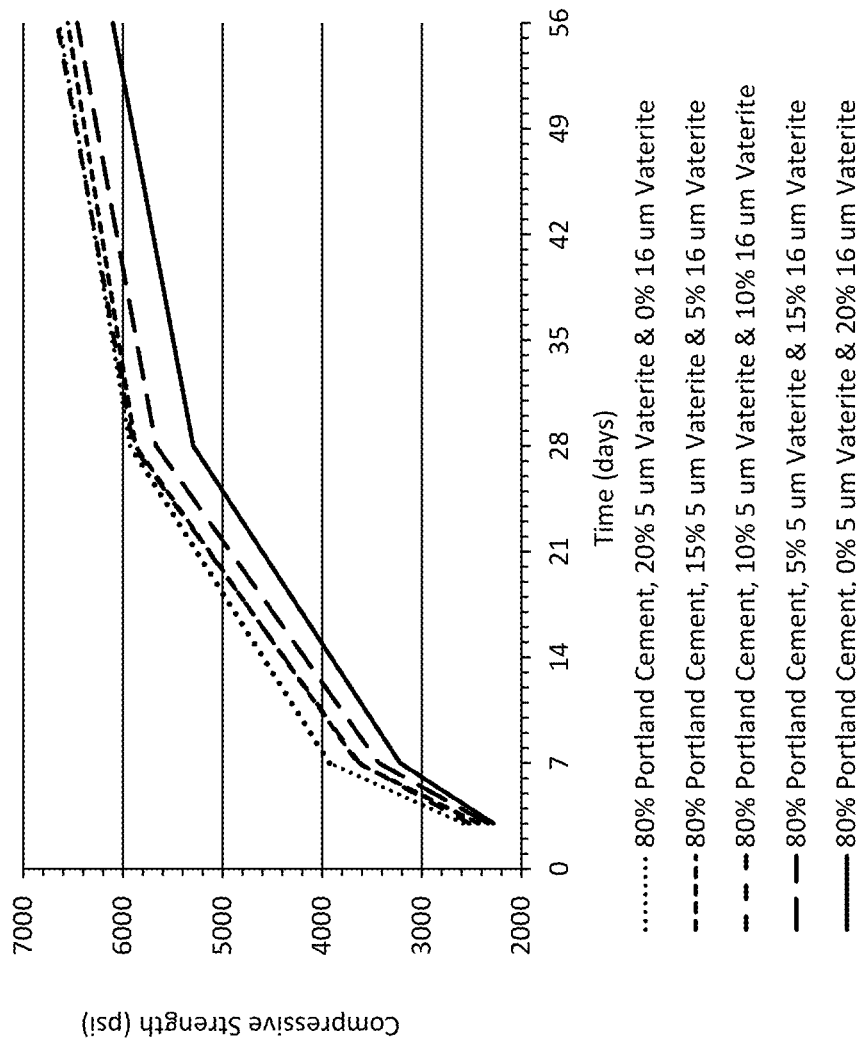
FIG. 6 illustrates effect of the bimodal distribution of the reactive vaterite cement particles on the compressive strength, as described in Example 2 herein.

As is shown in FIG. 5, in binary cement blends containing up to 20 percent reactive vaterite cement, the flow of the resulting mortar increased with increasing quantity of the larger reactive vaterite particle of the size 16 μm. However, as seen in FIG. 6, the strength did not decline in the same consistent manner as the flow increased, rather the bimodal distribution of 5 and 16 μm (or um) reactive vaterite particles produced the same 28-day strength as the mortar that utilized only 5 μm reactive vaterite particles as the vaterite cement component.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A 3D cement printing machine comprising:
   a printing head configured to dispose reactive vaterite cement;
   a feed system, in material communication with the printing head, the feed system configured to provide a feed of reactive vaterite onto the printing head;
   a feed of reactive vaterite cement, disposed in the feed system;

a material chamber operably connected to the feed system, configured to provide a condition to prevent transformation of the reactive vaterite to aragonite or calcite, wherein the condition comprises a pressure of 10-1,000 psi and a temperature of 20-300° C.; and a system operably connected to the 3D printing machine system and configured to produce the composition comprising reactive vaterite cement, comprising:
   a calcining reactor configured to calcine limestone to form a mixture comprising lime and a gaseous stream comprising carbon dioxide;
   a dissolution reactor operably connected to the calcination reactor configured for dissolving the mixture comprising lime in an aqueous N-containing salt solution to produce an aqueous solution comprising calcium salt; and
   a treatment reactor operably connected to the dissolution reactor configured for treating the aqueous solution comprising the calcium salt with the gaseous stream comprising carbon dioxide to form the composition comprising the reactive vaterite cement.

2. The system of claim 1, wherein the composition comprising reactive vaterite cement is thixotropic.

3. The system of claim 1, wherein the composition comprising reactive vaterite cement comprises unimodal, bimodal, or multi-modal particle distribution of reactive vaterite cement particles.

4. The system of claim 1, wherein the 3D printing machine is a desktop printer or a printer with rotating mechanical arm.

5. The system of claim 1, further comprising a mixer system operably connected to the feed system and configured to mix the composition comprising reactive vaterite cement.

6. The system of claim 5, wherein the composition comprising reactive vaterite cement is mixed with one or more of admixture, Portland cement, Portland cement clinker, aggregate, supplementary cementitious material (SCM), carbonate material, alkali metal accelerator, alkaline earth metal accelerator, and plasticizer.

7. The system of claim 1, further comprising a vibrator system configured to provide mixing of the composition comprising reactive vaterite cement and/or make it flowable wherein the vibrator system is selected from the group consisting of ultrasonic transducer, oscillator, mechanical vibration, non-impacting linear vibrator, electric vibrator, pneumatic vibrator, acoustic vibrator, magnetic vibrator, rotary turbine vibrator, turbine vibrator, compacting vibrator, roller vibrator, ball vibrator, and combination thereof.

8. The system of claim 1, wherein the 3D printed reactive vaterite cement product or the 3D printed cement product is selected from the group consisting of masonry unit, construction panel, conduit, basin, beam, column, slab, acoustic barrier, insulation material, building, house, driveway, foundation, kitchen slab, furniture, pavement, road, bridge, motorway, overpass, parking structure, brick, block, wall, footing for a gate, fence, pole, decorative object, and module thereof.

9. The system of claim 1, wherein the material chamber is a unit fitted on the feed system to provide pressure, the heat, and/or humidity to the composition comprising reactive vaterite cement to keep it flowable and is a unit fitted on the 3D printed reactive vaterite cement product to provide pressure, heat, and/or humidity to cure the 3D printed reactive vaterite cement product.

10. The system of claim 1, wherein the material chamber is a mobile unit.

11. The system of claim 1, wherein the composition comprising reactive vaterite cement, the 3D printed reactive vaterite cement product, and the 3D printed cement product is white in color.

12. The system of claim 1, further comprising a dye mixer configured for adding a color dye to the composition comprising reactive vaterite cement before and/or during the feeding, to the 3D printed reactive vaterite cement product during the printing and/or curing, and/or to the 3D printed cement product during and/or after the curing, to form a colored 3D printed cement product.

13. The system of claim 1, further comprising a control system configured to remotely and/or automatedly control the feed system, the 3D cement printing machine, a vibrator system, and/or the material chamber.

14. The system of claim 1, further comprising a blending reactor operably connected to the treatment reactor configured for blending one or more components selected from the group consisting of Portland cement, Portland cement clinker, aggregate, supplementary cementitious material (SCM), and combination thereof, with the composition comprising reactive vaterite cement.

15. The system of claim 1, further comprising a transfer system operably connected to the treatment reactor and/or the blending reactor and the feed system of the 3D printing machine system and configured to transfer the composition comprising reactive vaterite cement from the treatment reactor and/or the blending reactor to the feed system of the 3D printing machine system.

16. A 3D cement printing machine comprising:
   a printing head configured to dispose reactive vaterite cement;
   a feed system, in material communication with the printing head, the feed system configured to provide a feed of the reactive vaterite onto the printing head;
   the feed of reactive vaterite cement, disposed in the feed system;
   a material chamber operably connected to the feed system, configured to provide a condition to prevent transformation of the reactive vaterite to aragonite or calcite, wherein the condition comprises a pressure of 10-1,000 psi and a temperature of 20-300° C.; and a system operably connected to the 3D printing machine system and configured to produce the composition comprising the reactive vaterite, comprising:
   a dissolution reactor configured for dissolving limestone in an aqueous N-containing salt solution to produce an aqueous solution comprising calcium salt and a gaseous stream comprising carbon dioxide; and
   a treatment reactor operably connected to the dissolution reactor configured for treating the aqueous solution comprising the calcium salt with the gaseous stream comprising carbon dioxide to form the composition comprising reactive vaterite cement.

17. The system of claim 16, wherein the 3D printing machine is a desktop printer or a printer with rotating mechanical arm.

18. The system of claim 16, further comprising a mixer system operably connected to the feed system and configured to mix the composition comprising the reactive vaterite cement.

19. The system of claim 18, wherein the composition comprising the reactive vaterite cement is mixed with one or more of admixture, Portland cement, Portland cement clinker, aggregate, supplementary cementitious material (SCM), carbonate material, alkali metal accelerator, alkaline earth metal accelerator, and plasticizer.

20. The system of claim 16, wherein the material chamber is a mobile unit.

* * * * *